United States Patent
Togita

(10) Patent No.: US 11,140,392 B2
(45) Date of Patent: Oct. 5, 2021

(54) IMAGE ENCODING APPARATUS, IMAGE DECODING APPARATUS, CONTROL METHODS THEREOF, AND NON-TRANSITORY COMPUTER-READABLE STORAGE MEDIUM

(71) Applicant: CANON KABUSHIKI KAISHA, Tokyo (JP)

(72) Inventor: Koji Togita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 16/430,824

(22) Filed: Jun. 4, 2019

(65) Prior Publication Data

US 2019/0387228 A1    Dec. 19, 2019

(30) Foreign Application Priority Data

Jun. 15, 2018 (JP) .............................. JP2018-114689

(51) Int. Cl.
*H04N 19/124* (2014.01)
*H04N 19/63* (2014.01)
*H04N 19/44* (2014.01)

(52) U.S. Cl.
CPC ........... *H04N 19/124* (2014.11); *H04N 19/44* (2014.11); *H04N 19/63* (2014.11)

(58) Field of Classification Search
CPC ....... H04N 19/124; H04N 19/44; H04N 19/63
USPC ...................................................... 382/251
See application file for complete search history.

(56) References Cited

U.S. PATENT DOCUMENTS

| | | | |
|---|---|---|---|
| 6,154,493 A * | 11/2000 | Acharya | H04N 19/186 375/240.19 |
| 8,363,717 B2 | 1/2013 | Togita et al. | |
| 9,319,682 B2 | 4/2016 | Togita | |
| 10,356,408 B2 | 7/2019 | Suzuki et al. | |
| 2013/0177074 A1 | 7/2013 | Togita et al. | |
| 2016/0366412 A1* | 12/2016 | Sasai | H04N 19/119 |
| 2017/0118491 A1 | 4/2017 | Togita | |
| 2017/0155902 A1* | 6/2017 | Suzuki | H04N 19/63 |

FOREIGN PATENT DOCUMENTS

JP     2002-516540 A    6/2002
WO       99/60793 A1    11/1999

* cited by examiner

*Primary Examiner* — Wednel Cadeau
(74) *Attorney, Agent, or Firm* — Venable LLP

(57) ABSTRACT

An encoding apparatus comprises a dividing unit that divides RAW image data into a plurality of tiles, a generating unit that generates planes of a plurality of channels having mutually-different components for each of the tiles, a transforming unit that frequency-transforms the plane of each channel and generates sub-band data of a plurality of resolution levels, a controller that divides each of the plurality of sub-band data into the same number of segments to divide the sub-band data into a plurality of segments corresponding to the same regions, and determines first quantization parameters common for the plurality of sub-band data in each segment, a quantizing unit that, based on the determined first quantization parameters, quantizes each sub-band data, and an encoder that encodes a quantization result on a sub-band-by-sub-band basis.

11 Claims, 29 Drawing Sheets

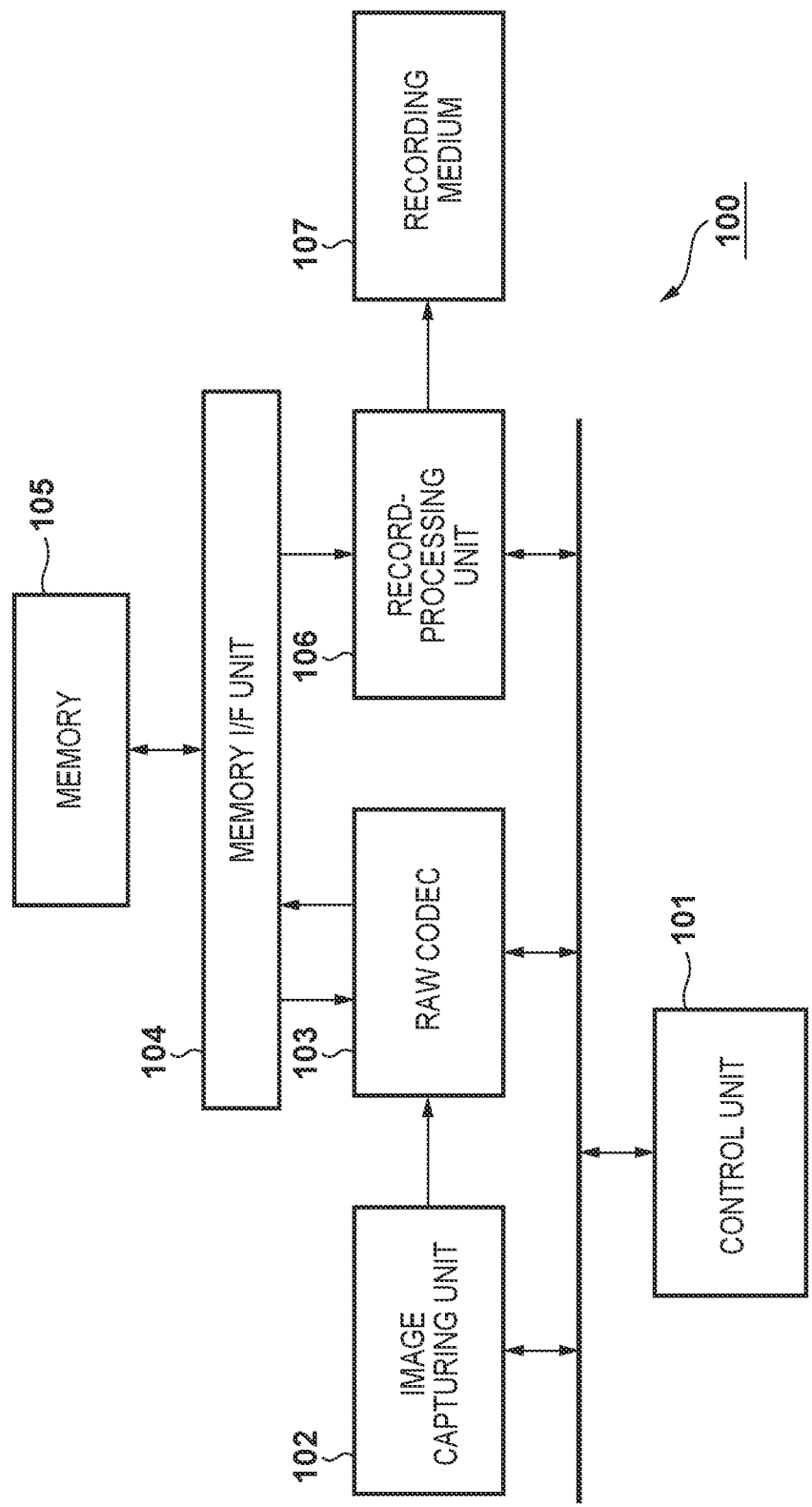

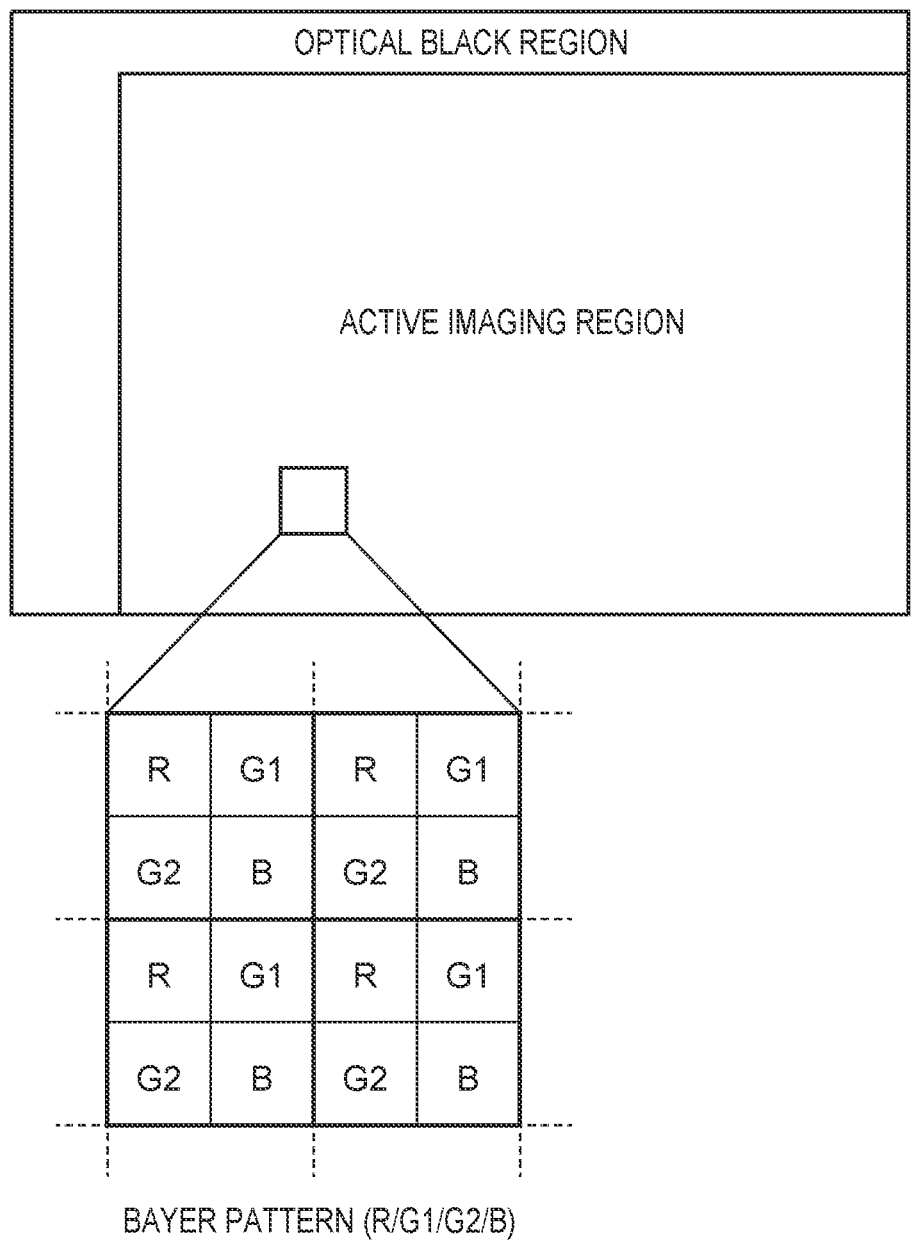

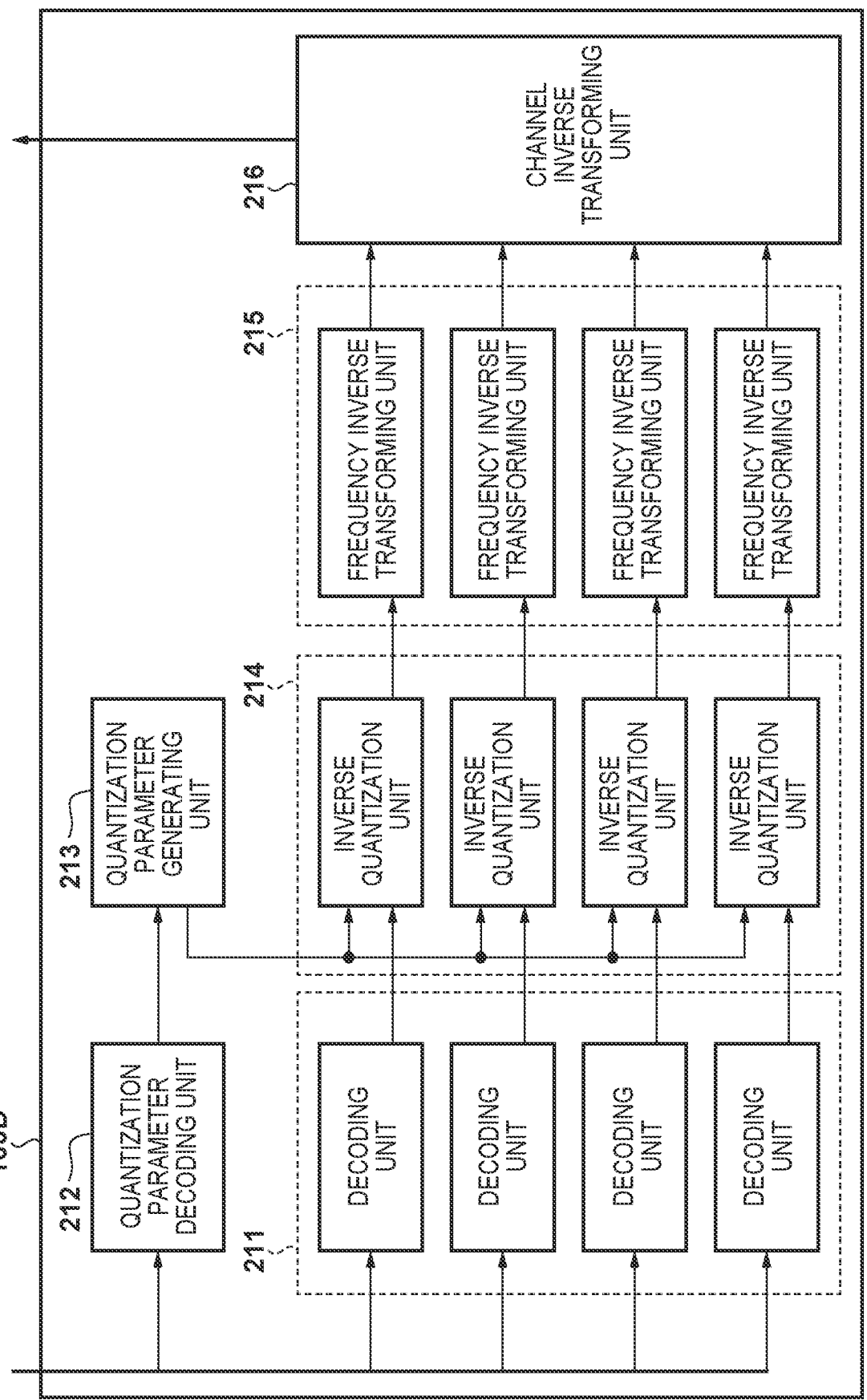

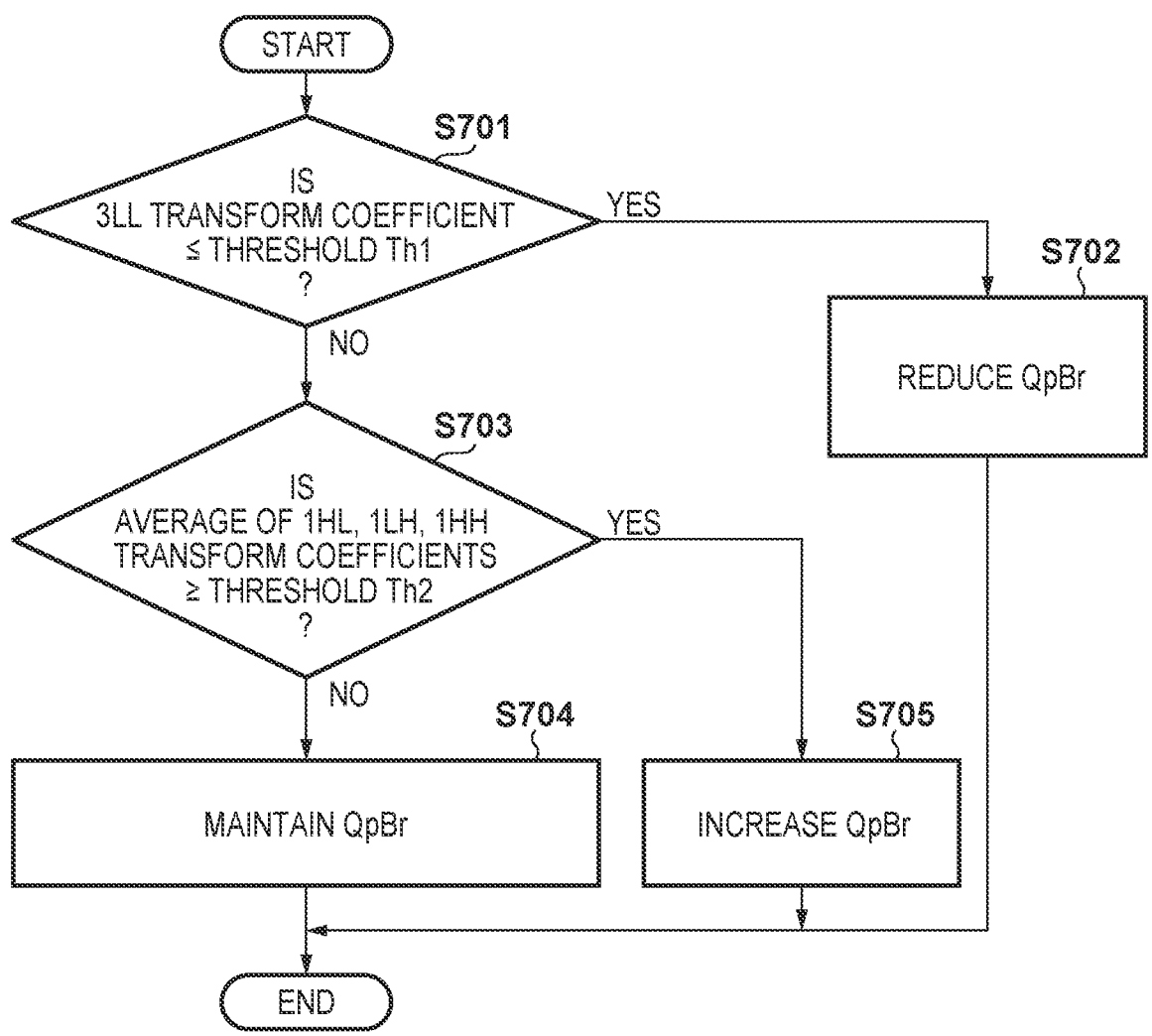

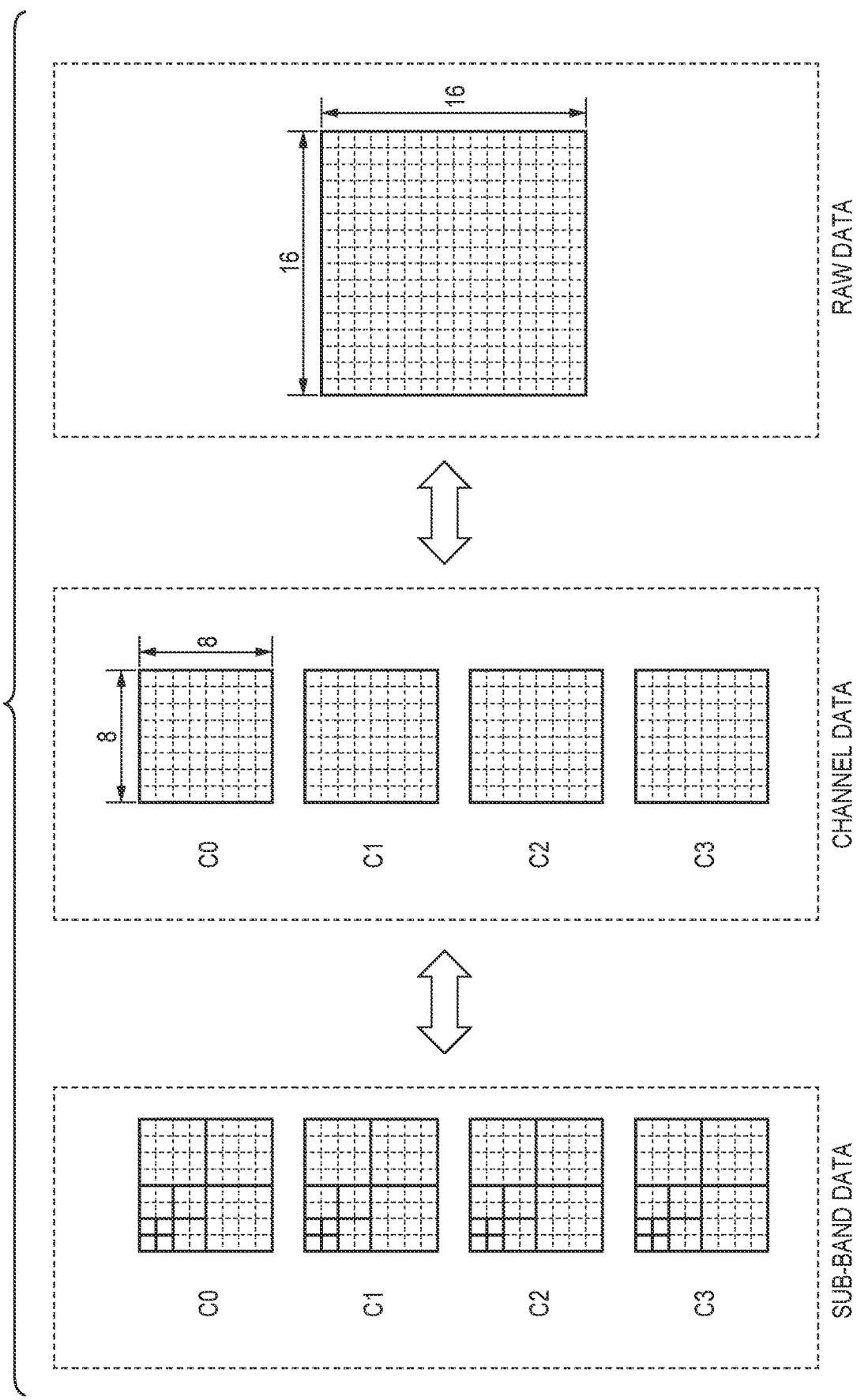

FIG. 10A

| main_header () { | |
|---|---|
| coded_data_size | u (32) |
| width | u (32) |
| height | u (32) |
| depth | u (8) |
| channel | u (8) |
| type | u (8) |
| lev | u (8) |
| } | |

*u (8) : unsigned integer 8 bits  *u (16) : unsigned integer 16 bits
*u (32) : unsigned integer 32 bits

FIG. 10B

| tile_header () { | |
|---|---|
| tile_index | u (32) |
| tile_data_size | u (32) |
| tile_width | u (32) |
| tile_height | u (32) |
| } | |

*u (8) : unsigned integer 8 bits  *u (16) : unsigned integer 16 bits
*u (32) : unsigned integer 32 bits

FIG. 10C

| qp_header () { | |
|---|---|
| qp_data_size | u (32) |
| qp_width | u (32) |
| qp_height | u (32) |
| } | |

*u (8) : unsigned integer 8 bits  *u (16) : unsigned integer 16 bits
*u (32) : unsigned integer 32 bits

FIG. 10D

| channel_header () { | |
|---|---|
| channel_index | u (32) |
| channel_data_size | u (32) |
| } | |

*u (8) : unsigned integer 8 bits  *u (16) : unsigned integer 16 bits
*u (32) : unsigned integer 32 bits

FIG. 10E

| sb_header () { | |
|---|---|
| sb_index | u (32) |
| sb_data_size | u (32) |
| sb_qp_a | u (16) |
| sb_qp_b | u (16) |
| } | |

*u (8) : unsigned integer 8 bits  *u (16) : unsigned integer 16 bits
*u (32) : unsigned integer 32 bits

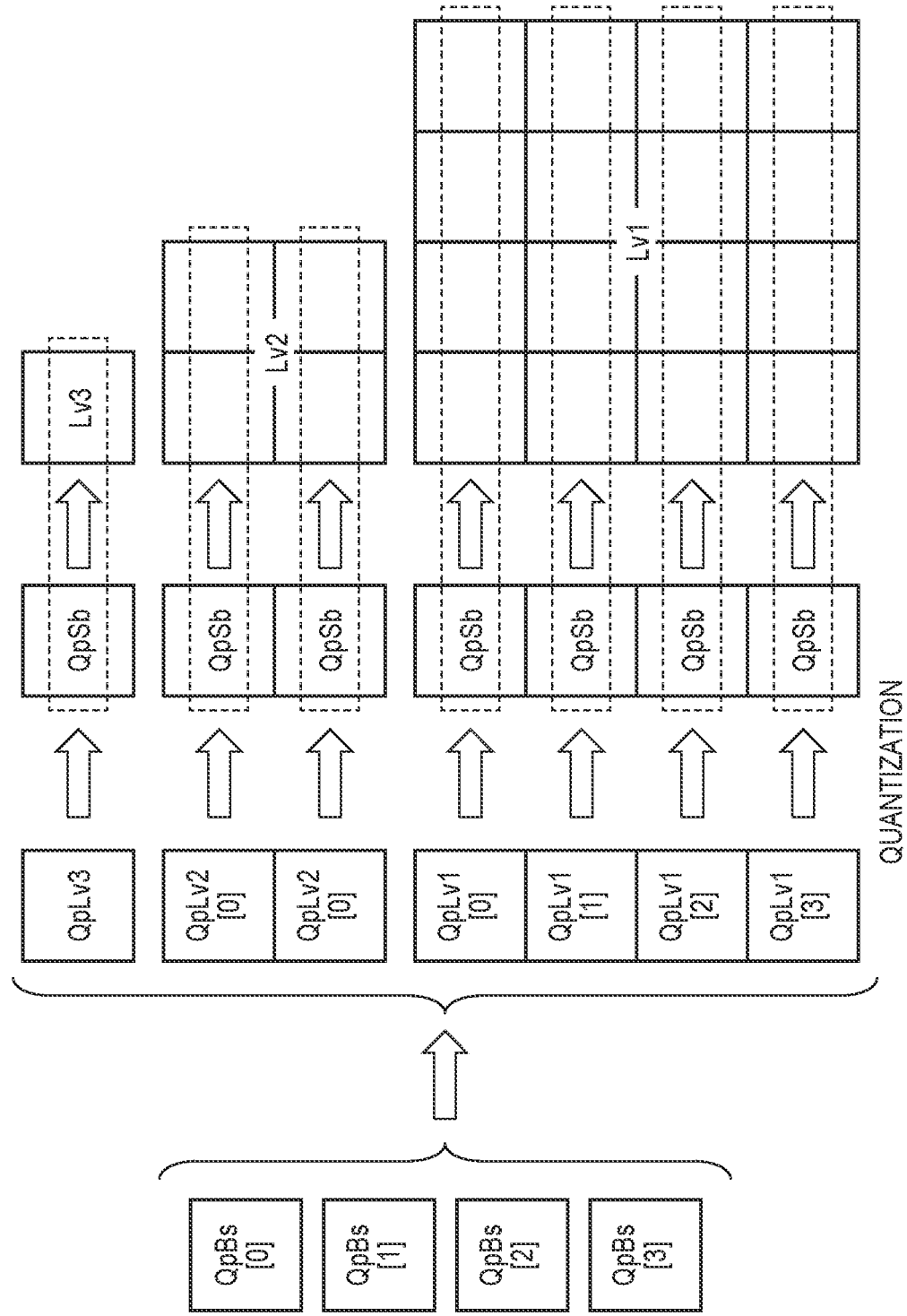

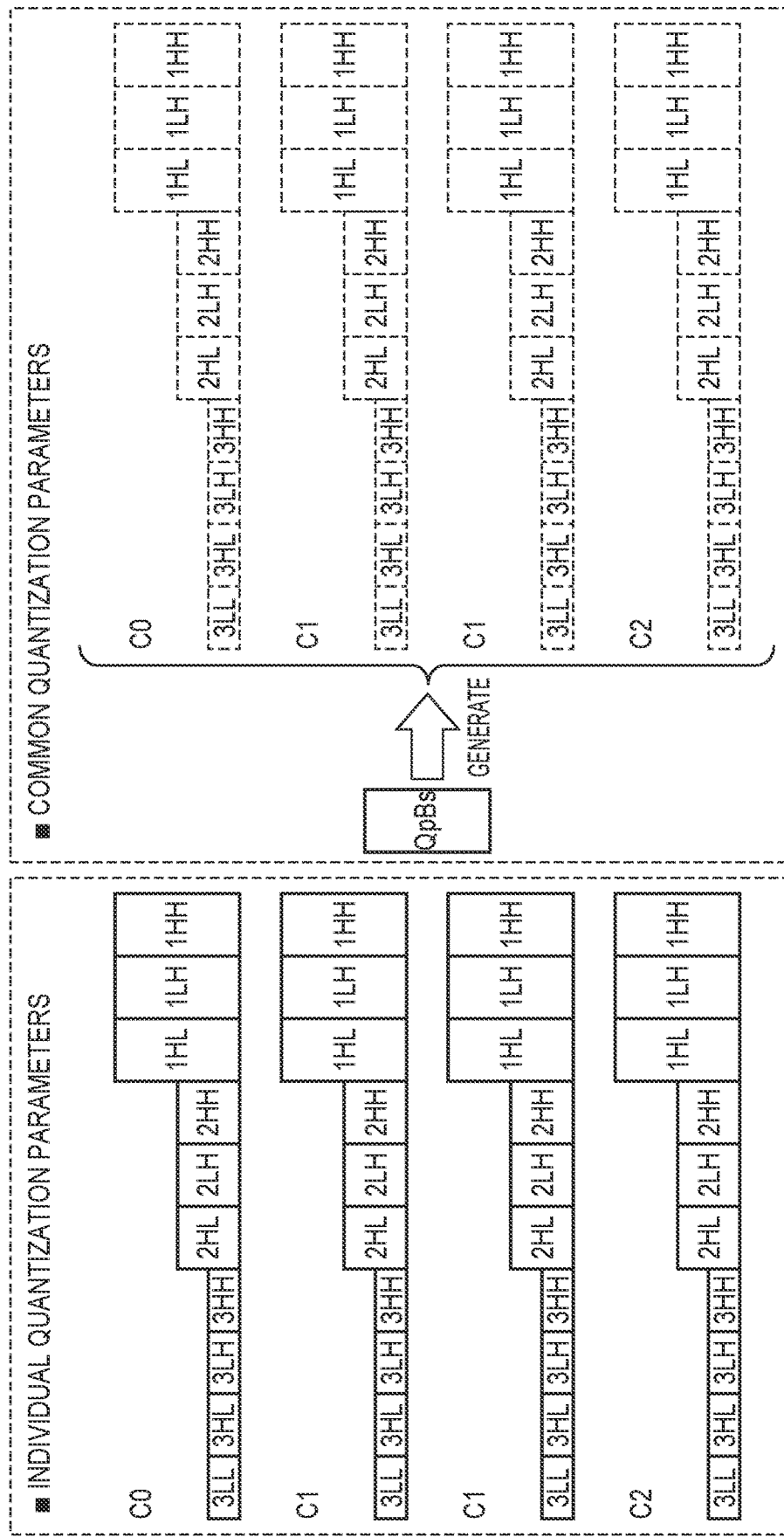

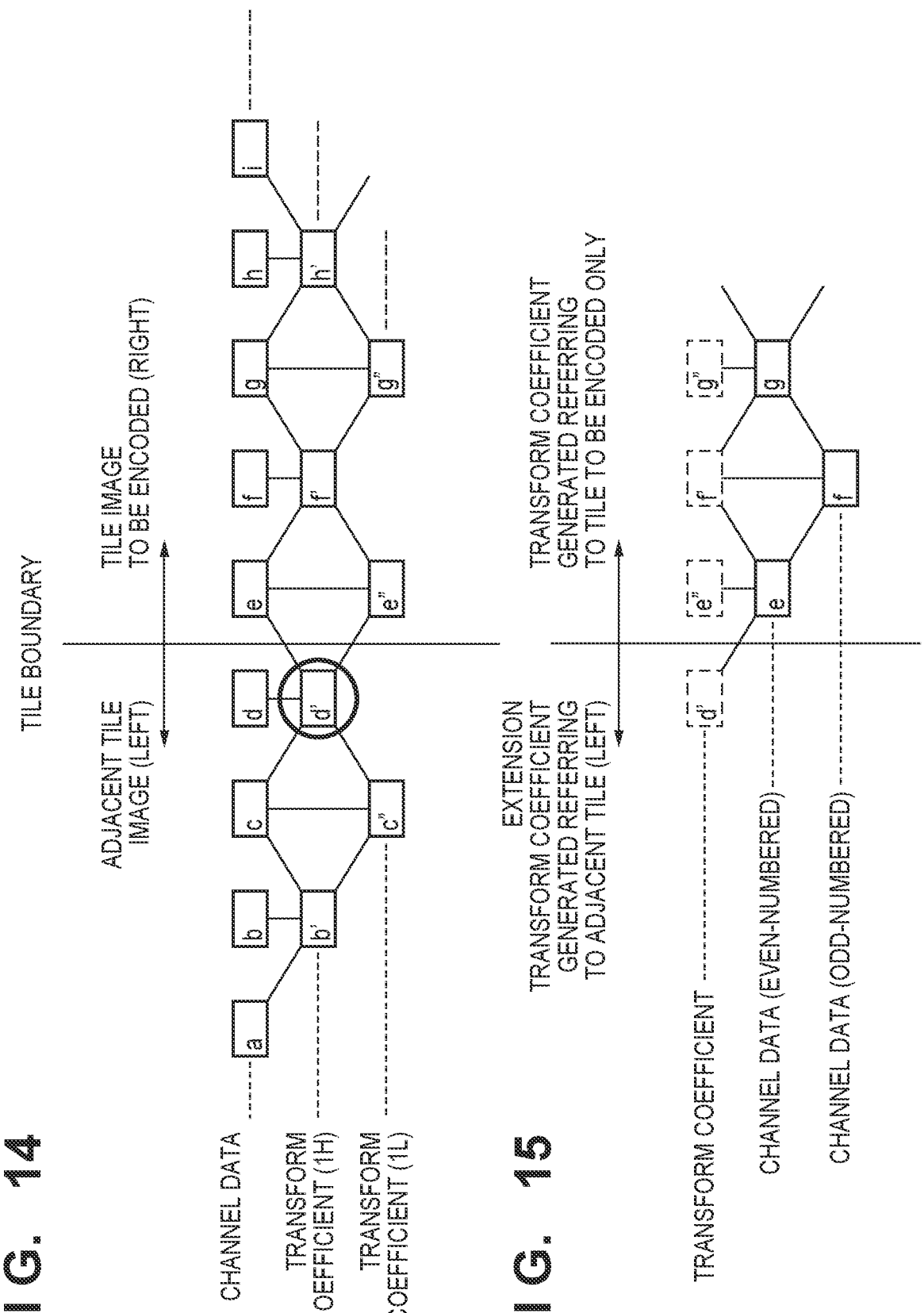

IMAGE ENCODING APPARATUS, IMAGE DECODING APPARATUS, CONTROL METHODS THEREOF, AND NON-TRANSITORY COMPUTER-READABLE STORAGE MEDIUM

BACKGROUND OF THE INVENTION

Field of the Invention

The present invention relates to image encoding technology.

Description of the Related Art

CCDs or CMOS image sensors are employed as image sensors in digital cameras, video cameras, and the like. When using a single-panel image sensor, green, blue, and red pixel data are obtained by employing a Bayer pattern color filter. A digital camera generates final image data by subjecting Bayer pattern green, blue, and red data ("RAW data" hereinafter) to developing processing including demosaicing processing, noise removal processing, optical distortion correction, color correction processing, and the like. Image data compressed using an encoding method such as JPEG (for still images) or H.264 (for moving images) is thus recorded into a recording medium. However, many image capturing apparatuses have functions for recording the RAW data before the data is subjected to the developing processing, so that the user can carry out his or her preferred developing processing.

Uncompressed or losslessly-compressed formats are often used when recording RAW data, and thus the size of the compressed RAW data that is recorded is typically greater than the normal compressed image data of images after developing. However, the densities and resolutions of image sensors continue to increase, and recording RAW data at compact sizes is becoming increasingly important. As a lossy compression format that shows no loss visually, a method has been proposed in which a plurality of color channels are generated from RAW data, each channel is subjected to a two-dimensional discrete wavelet transform, and each of generated sub-bands is individually quantized and compressed and then recorded as coded data (see Japanese Patent Laid-Open No. 2002-516540).

Here, consider a case where data having four color channels, namely R, B, G1, and G2, is generated from RAW data, and the data of each channel is then subjected to three-level octave division through the two-dimensional discrete wavelet transform. In this case, 10 sub-bands will be generated for each channel. Because there are four channels, a total of 4×10 sub-bands will be generated. Thus 4×10=40 quantization parameters are required to individually quantize the sub-bands. Assuming that finer quantization control is to be carried out in predetermined block units in accordance with features within the screen, a number of quantization parameters equivalent to 4×10×the number of block divisions are required. In other words, when compression-encoding RAW data, the data amount of the quantization parameters will become extremely high as well. This makes it difficult to record the RAW data at a compact size while maintaining image quality that shows no loss visually.

SUMMARY OF THE INVENTION

Having been achieved in light of the above-described problem, the present invention provides a technique that, when dividing RAW image data into a plurality of tiles and encoding the data, enables the RAW data to be recorded at a compact size by suppressing the data amount of quantization parameters included in coded data, while suppressing a drop in image quality at tile boundaries and implementing lossy compression through flexible quantization control.

According to an aspect of the present invention, there is provided an encoding apparatus that encodes Bayer pattern RAW image data, the apparatus comprising: a dividing unit that divides RAW image data to be encoded into a plurality of tiles, a generating unit that generates planes of a plurality of channels having mutually-different components for each of the tiles obtained from the division by the dividing unit, a transforming unit that frequency-transforms the plane of each channel generated by the generating unit, and generates sub-band data of a plurality of resolution levels, a control unit that divides each of the plurality of sub-band data into the same number of segments to divide the sub-band data into a plurality of segments corresponding to the same regions in the RAW image data, and determines first quantization parameters common for the plurality of sub-band data in each segment, a quantizing unit that, based on the first quantization parameters determined by the control unit, quantizes each sub-band data obtained by the transforming unit on a segment-by-segment basis, and an encoding unit that encodes a quantization result, obtained from the quantizing, on a sub-band-by-sub-band basis, wherein when generating the planes of the plurality of channels from a tile of interest, the generating unit generates the planes of the plurality of channels from data in the tile of interest, and data in an adjacent tile, adjacent to the tile of interest, within a predetermined distance from a boundary with the tile of interest, and wherein the control unit determines the first quantization parameters having divided the sub-band data of the tile of interest into a plurality of segments, and the quantization parameters of a segment adjacent with the tile of interest with respect to the boundary are applied to the sub-band data of the adjacent tile.

According to the present invention, when dividing RAW image data into a plurality of tiles and encoding the data, the RAW data can be recorded at a compact size by suppressing the data amount of quantization parameters included in coded data, while suppressing a drop in image quality at tile boundaries and implementing lossy compression through flexible quantization control.

Further features of the present invention will become apparent from the following description of exemplary embodiments (with reference to the attached drawings).

BRIEF DESCRIPTION OF THE DRAWINGS

FIG. 1A is a block diagram illustrating an example of the configuration of an image processing apparatus according to an embodiment.

FIG. 1B is a diagram illustrating Bayer pattern RAW data.

FIG. 2B is a block diagram illustrating decoding by the RAW codec according to an embodiment.

FIG. 7 is a flowchart illustrating processing of quantization control based on image quality properties according to an embodiment.

FIG. 8 is a diagram illustrating a relationship between units of quantization control and RAW data according to an embodiment.

FIGS. 10A to 10E are diagrams illustrating an example of syntax elements in header information according to an embodiment.

FIGS. 12A to 12C are diagrams illustrating an example of units of quantization control based on image quality properties according to a second embodiment.

FIGS. 13A and 13B are diagrams illustrating a comparison of a data amount of encoded data according to the second embodiment with a conventional technique.

FIG. 14 is a diagram illustrating discrete wavelet transform processing according to a third embodiment.

FIG. 15 is a diagram illustrating a discrete wavelet inverse transform method according to the third embodiment.

DESCRIPTION OF THE EMBODIMENTS

Figure 2A:
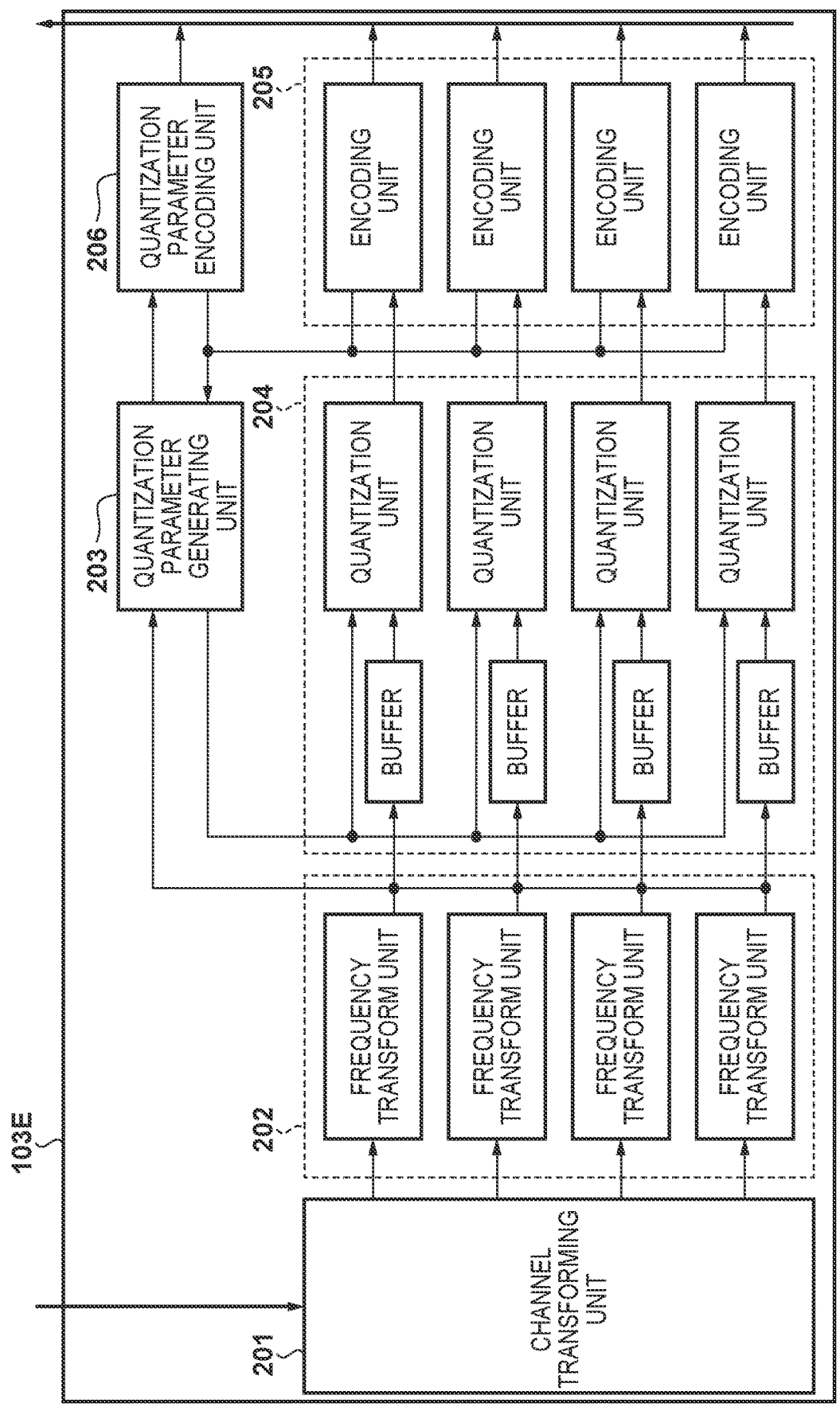
FIG. 2A is a block diagram illustrating encoding by a RAW codec according to an embodiment.

Hereinafter, embodiments of the present invention will be described in detail with reference to the appended drawings. It should be noted that the configurations described in the following embodiments are merely examples, and that the present invention is not intended to be limited to the configurations illustrated in the drawings. A preamble to the embodiments will be described first.

First Embodiment

FIG. 1A is a block diagram illustrating the main configuration, pertaining to encoding, in an image capturing apparatus 100 according to an embodiment. The image capturing apparatus 100 can be realized as a digital camera or a digital video camera, for example. Aside from these, the image capturing apparatus 100 can also be realized as any information processing terminal or image processing apparatus, such as a personal computer, a mobile phone, a smartphone, a PDA, a tablet terminal, a mobile media player, or the like. FIG. 1A assumes a situation where the device functions as an image capturing apparatus, i.e. a digital camera or the like, and therefore illustrates a configuration that includes an image capturing unit 102. However, the present invention can be applied in an image encoding apparatus, an image decoding apparatus, an image recording apparatus, an image compression apparatus, an image restoring apparatus, or the like capable of recording and playing back RAW images, and thus image capturing unit 102, which is the source of the RAW image data, is not absolutely necessary. This is because the type of the source of the RAW image data is not limited, and may be a storage medium storing RAW image data, a file server located on a network, or the like.

In the image capturing apparatus 100, a control unit 101 controls the processing units constituting the image capturing apparatus 100, and is constituted by a CPU, ROM storing programs executed by the CPU, and RAM serving as a work area. The image capturing unit 102 includes a lens optical system including an optical lens, an aperture stop, and a focus control and lens driving unit, and that is capable of optical zooming; and an image sensor, such as a CCD image sensor or a CMOS image sensor, that transforms optical information from the lens optical system into electrical signals. The image capturing unit 102 supplies RAW data (also called "RAW image data"), obtained by transforming the electrical signals obtained from the image sensor into digital signals, to a RAW codec 103.

Here, a single piece of the RAW data is, as illustrated in FIG. 1B, constituted of an active imaging region, which is a pixel region that receives light, and an optical black region, which is a pixel region that blocks light. The pixels form a cyclical pattern of R (red), G1 (green), G2 (green), and B (blue). Human vision is known to be highly sensitive to green. As such, twice the number of green pixels are provided compared to red and blue to enhance the sense of the resolution in images. Although the RAW data is constituted by four color elements in a Bayer pattern in the present embodiment, the pattern and the color elements are not limited to this configuration, and another system may be used instead.

The RAW codec 103 encodes the RAW data obtained from the image capturing unit 102 and writes the generated encoded data into memory 105. Unencoded RAW data may be obtained from a recording medium 107, and encoded data may then be generated by executing an encoding process according to the present embodiment. The RAW codec 103 can also restore the RAW data by decoding the encoded data. Configurations and operations pertaining to the RAW codec 103 will be described in detail later.

A memory I/F unit 104 carries out processing for arbitrating memory access requests from the various processing units to the memory 105, and requests for reading from and writing to the memory 105. The memory 105 is constituted by high-speed volatile memory, for example (typically, SRAM), for storing various types of data output from the processing units constituting the image capturing apparatus 100. A record-processing unit 106 reads out the encoded data stored in the memory 105, formats the data according to a predetermined recording format, and records the data into the recording medium 107. The record-processing unit 106 also reads out encoded data from the recording medium 107 for decoding and stores that data in the memory 105. The recording medium 107 is a recording medium constituted by non-volatile memory, for example, and is configured to be removable from the image capturing apparatus 100. The foregoing has described the main parts, pertaining to encoding, of the image capturing apparatus 100 according to the embodiment.

The configuration of and flow of processing by the RAW codec 103 will be described in detail next with reference to the block diagrams of FIGS. 2A and 2B. The RAW codec 103 is constituted by an encoding unit and a decoding unit. FIG. 2A illustrates the configuration of a RAW data encoding unit 103E constituting the RAW codec 103, and FIG. 2B illustrates the configuration of a RAW data decoding unit 103D constituting the RAW codec 103.

Figure 3A:
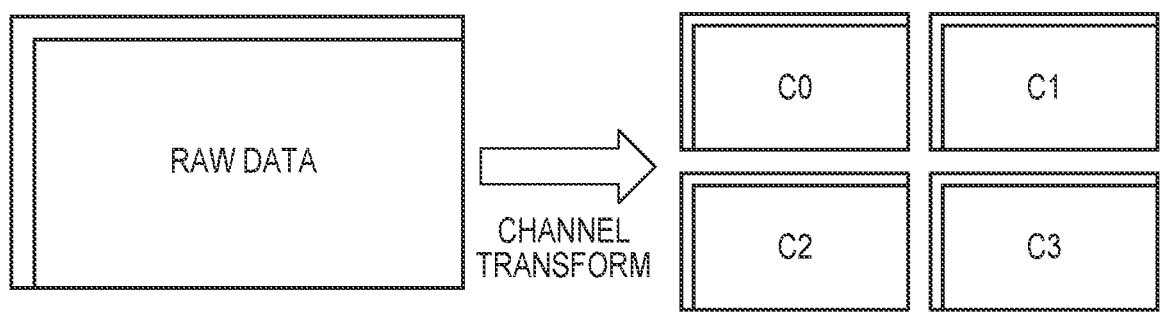
FIGS. 3A to 3C are diagrams illustrating examples of channel conversion according to an embodiment.

The RAW data encoding unit 103E illustrated in FIG. 2A is constituted primarily of a channel transforming unit 201, frequency transform units 202, a quantization parameter generating unit 203, quantization units 204, encoding units 205, and a quantization parameter encoding unit 206. As illustrated in FIG. 3A, the channel transforming unit 201 transforms input Bayer pattern RAW data into plane data of a plurality of channels (four channels, from C0 to C3, in the embodiment), each of which is expressed as a single component. The frequency transform units 202 and the quantization units 204 are the same number of processing blocks as there are channels obtained from the transformation, and these units carry out processing in parallel for all of the channels. In the present embodiment, the channel transforming unit 201 first transforms the RAW data into four channels, one for each of the Bayer pattern R, G1, G2, and B. Furthermore, the channel transforming unit 201 then transforms each of R, G1, G2, and B into four channels, namely C0 to C3, through the following transformation equation (1).

$C0=a+c$ $C1=B-G2$ $C2=R-G1$ $C3=b-a$ (1)

In the equation, $a=G2+floor(C1/2)$, $b=G1+floor(C2/2)$, and $c=a+floor(C3/2)$. Here, floor(x) is a floor function that returns a maximum integer less than or equal to a real number x.

Figure 3B:
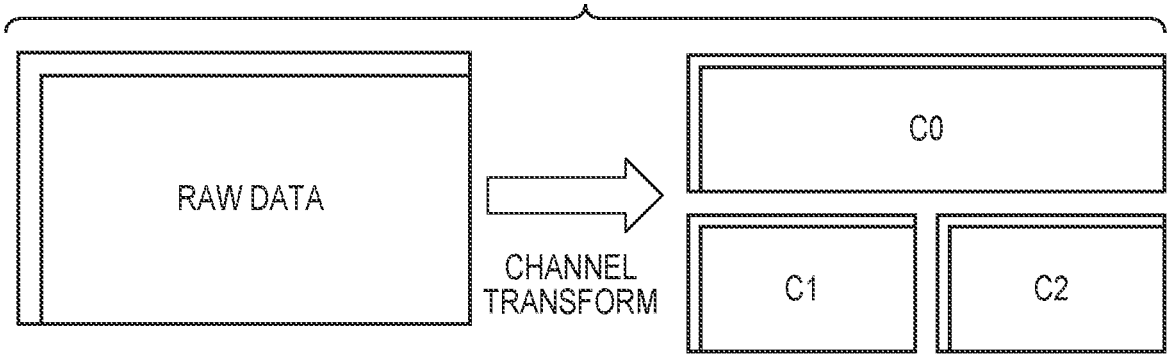
Figure 3C:
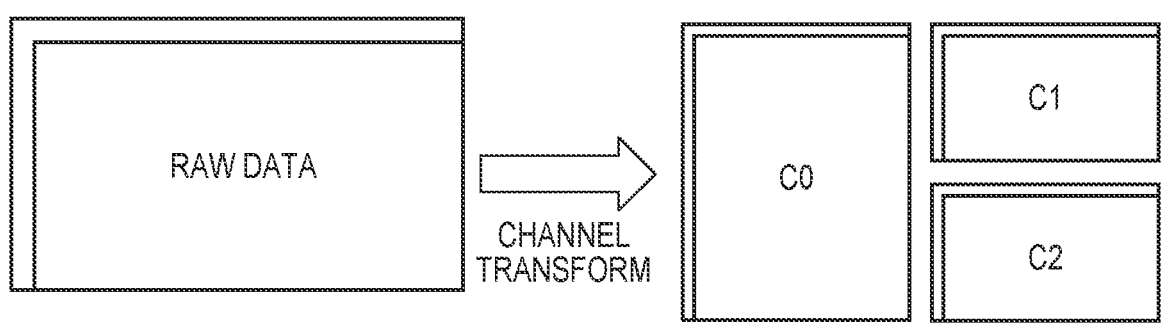

Although an example of a configuration that transforms into four channels, as illustrated in FIG. 3A, is given here, a different number of channels or a different transformation method may be used, such as transforming into three channels for R, B, and G corresponding to a combination of G1 and G2, as illustrated in FIGS. 3B and 3C. In sum, any configuration is acceptable as long as the original Bayer pattern RAW data can be reproduced.

Next, the frequency transform units 202 subject the plane data to a frequency transform process through discrete wavelet transform at a predetermined resolution level (called simply "level" or "lev" hereinafter) in units of channels, and output a generated plurality of sub-band data (transform coefficients) to the quantization parameter generating unit 203 and the quantization units 204.

As illustrated in the drawings, buffers having appropriate capacities are provided immediately before the quantization units 204, between the frequency transform units 202 and the quantization units 204. Although the details will be clarified through later descriptions, the buffers are provided because when each of the quantization units 204 quantizes the transform coefficient of a segment of interest within a block of interest, the quantization parameter generating unit 203 needs time to determine quantization parameters for that segment of interest.

Figure 4A:
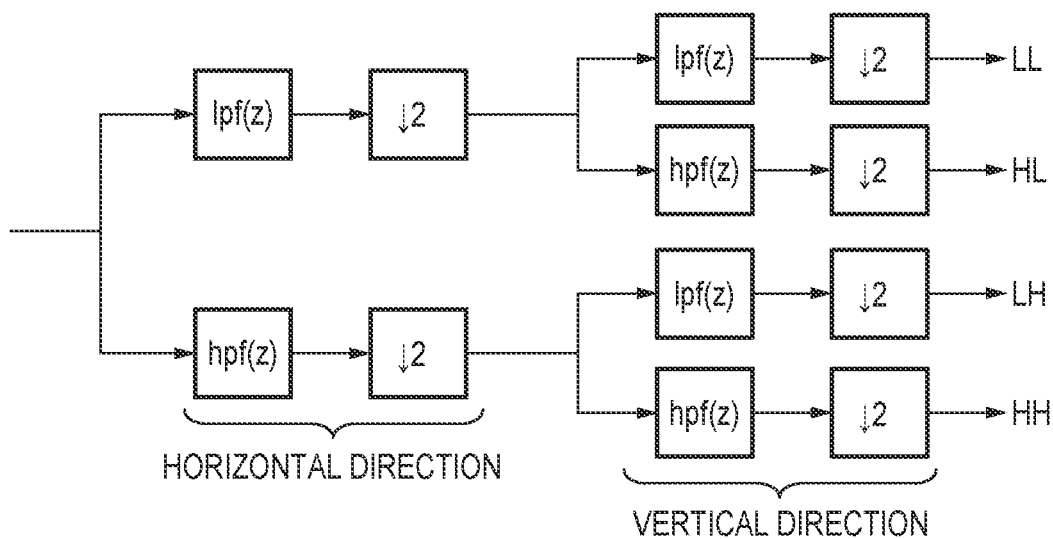
FIGS. 4A to 4C are diagrams illustrating frequency transforms (sub-band division) according to an embodiment.
Figure 4B:
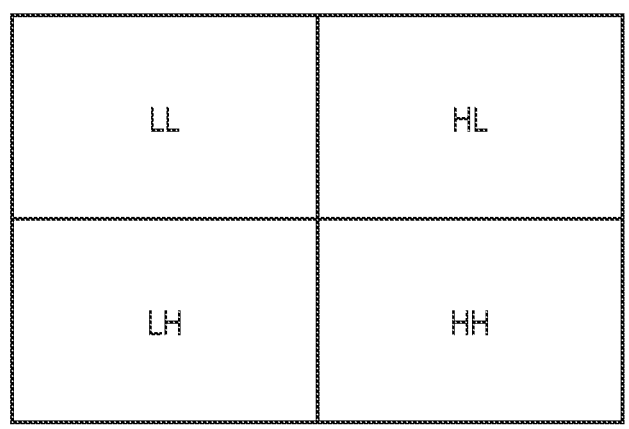

FIG. 4A illustrates a filter bank configuration for realizing the discrete wavelet transform involved in a process for dividing a lev=1 sub-band. As illustrated in FIG. 4B, a single low-frequency sub-band LL and three high-frequency sub-bands HL, LH, and HH are obtained by executing the discrete wavelet transform process in the horizontal and vertical directions. Transfer functions of the low-pass filters ("lpf" hereinafter) and high-pass filters ("hpf" hereinafter) illustrated in FIG. 4A are expressed by the following equations (2) and (3), respectively.

$lpf(z)=(-z^{-2}+2z^{-1}+6+2z-z^2)/8$ (2)

$hpf(z)=(-z^{-1}+2-z)/2$ (3)

Figure 4C:
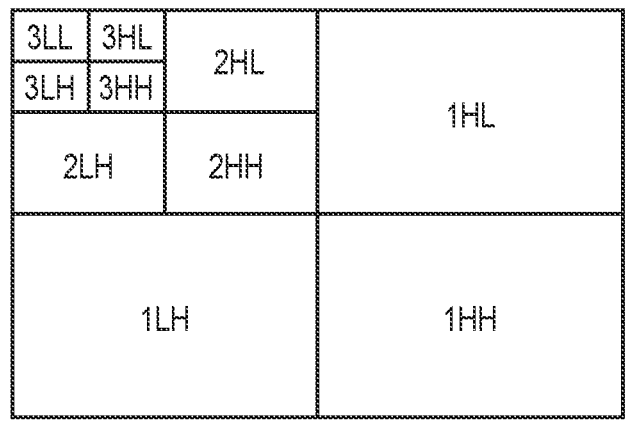

In FIG. 4A, "↓2" expresses 2-to-1 downsampling. As such, downsampling is executed once each in the horizontal direction and the vertical direction, and thus the size of each individual sub-band obtained from a single wavelet transform is 1/4 the original size. If lev is greater than 1, the sub-band division will be carried out recursively on the low-frequency sub-band (LL) generated at the level immediately before. For example, if lev=3, sub-band data is generated corresponding to 10 sub-bands, as illustrated in FIG. 4C. Although the discrete wavelet transform here is constituted by a five-tap lpf and a three-tap hpf as indicated in equations (2) and (3), the filter configuration may have a different number of taps and different coefficients.

The quantization parameter generating unit 203 generates first quantization parameters, common for all channels and all sub-bands, for carrying out a quantization process on the sub-band data (transform coefficients) generated by the frequency transform units 202, and outputs the first quantization parameters to the quantization parameter encoding unit 206. The quantization parameter generating unit 203 also generates individual second quantization parameters for each of the channels and sub-bands from the first quantization parameters, and supplies the second quantization parameters to the quantization units 204. The units of generation and generation methods of the first quantization parameters and the second quantization parameters will be described later with reference to FIGS. 5 to 7 and so on.

The quantization units 204 carry out quantization processes on the sub-band data (transform coefficients) input from the frequency transform units 202, on the basis of the second quantization parameters supplied from the quantization parameter generating unit 203, and output quantized sub-band data (transform coefficients) to the encoding units 205 as quantization results.

Figure 4D:
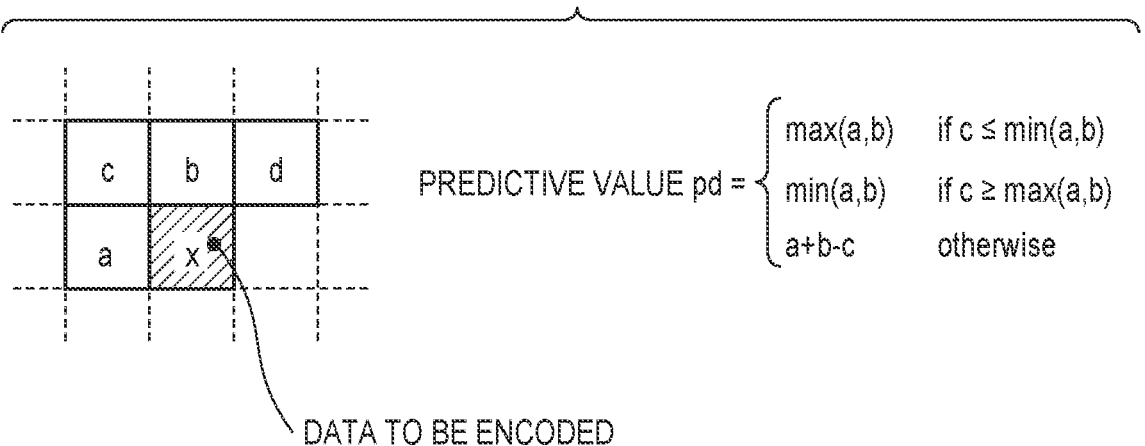
FIG. 4D is a diagram illustrating a predictive encoding method (MED prediction).

The encoding units 205 carry out predictive differential entropy encoding in raster scan order, on a sub-band-by-sub-band basis, on the quantized sub-band data (transform coefficients) input from the quantization units 204. The quantized sub-band data is encoded in units of sub-bands as a result. As illustrated in FIG. 4D, for the data (transform coefficients) to be encoded, each of the encoding units 205 generates a predictive value pd through Median Edge Detector (MED) prediction from surrounding encoded data (a, b, and c, in FIG. 4D). Then, each of the encoding units 205 subject difference data between a value xd of the data x to be encoded and the predictive value pd to entropy encoding through Huffman coding, Golomb coding, or the like, for example, and stores the generated encoded data in the memory 105. The encoding is carried out in raster scan order, and thus if the data to be encoded is located in the first line or at the left end of the sub-band, some of the surrounding data a, b, c, and d illustrated in FIG. 4D will be missing (will be outside the sub-band). In this case, it is assumed that the missing surrounding data has a pre-set value. When the data to be encoded is at the starting position of the sub-band (the upper-left corner) in particular, all of the surrounding data is assumed to be missing, and thus the value xd of that data x to be encoded is assumed to be encoded as-is. The difference data is encoded for the data to be encoded thereafter. Note that other methods may be used for the predictive encoding and the entropy encoding. Generated code amounts, generated in units of lines for each sub-band, are supplied to the quantization parameter generating unit 203. The specific data structure of the encoded data generated by the encoding units 205 will be described later with reference to FIGS. 9A, 9B, and 10A to 10E.

The quantization parameter encoding unit 206 is a processing unit that encodes the first quantization parameters input from the quantization parameter generating unit 203. The quantization parameter encoding unit 206 encodes the quantization parameters through the same encoding method as the encoding units 205, and stores the generated encoded quantization parameters in the memory 105. Although FIG. 2A illustrates a case where the quantization parameter encoding unit 206 is provided separate from the encoding units 205, both units employ the same encoding method, and thus a configuration in which the encoding units 205 share the function of the quantization parameter encoding unit 206 is also possible. The foregoing has described the configuration and processing details of the RAW data encoding unit 103E according to the embodiment.

The configuration of the RAW data decoding unit 103D will be described next. The RAW data decoding unit 103D is constituted primarily of decoding units 211, a quantization parameter decoding unit 212, a quantization parameter generating unit 213, inverse quantization units 214, frequency inverse transforming units 215, and a channel inverse transforming unit 216.

First, the decoding units 211 decode the encoded data of each channel, input from the memory 105, through a decoding method corresponding to the encoding method employed by the RAW data encoding unit 103E, and restore the quantized sub-band data (transform coefficients). For example, if a predictive differential entropy encoding method has been used, a corresponding predictive differential entropy decoding method is employed. At this time, the encoded data has been produced by entropy-encoding the difference data between the predictive value pd, which is generated from the surrounding data of the data to be encoded (transform coefficients), and the value xd of the data x to be encoded, as illustrated in FIG. 4D. Accordingly, the decoding units 211 restore the difference data by decoding the encoded data through an entropy decoding method. Each of the decoding units 211 then generates the predictive value pd from the decoded data surrounding data to be decoded, in the same manner as the encoding units 205 described earlier. Each of the decoding units 211 then restores the data x to be decoded (corresponding to quantized transform coefficients) by adding the predictive value pd to the restored difference data. The encoded data is encoded in units of sub-bands, and thus the decoding units 211 restore the transform coefficients in units of sub-bands as well.

The quantization parameter decoding unit 212 decodes the encoded first quantization parameters included in the encoded data input from the memory 105, using the same decoding method as the decoding units 211, and restores the first quantization parameters. The quantization parameter decoding unit 212 also decodes predetermined coefficients (coefficients α and β in the linear transformation equation (5), which will be described later) for calculating the second quantization parameters in units of channels and sub-bands. The quantization parameter decoding unit 212 then outputs the decoding results to the quantization parameter generating unit 213. The quantization parameter generating unit 213 generates the second quantization parameters in units of channels and sub-bands from the first quantization parameters provided by the quantization parameter decoding unit 212 and the predetermined coefficients, and provides the second quantization parameters to the inverse quantization units 214.

The inverse quantization units 214 inverse-quantize the quantized sub-band data, which is in units of channels and has been output from the decoding units 211, using the second quantization parameters provided from the quantization parameter generating unit 213, and restores the sub-band data. The frequency inverse transforming units 215 carry out frequency inverse transform processes through discrete wavelet inverse transform, and restore the channels from the sub-band data (transform coefficients) in the predetermined division level. The channel inverse transforming unit 216 inverse-transforms the input channel data C0 to C3 and restores the original RAW data. For example, if the channel transforming unit 201 of the RAW data encoding unit 103E has transformed the Bayer pattern R, G1, G2, and B into the four channels C0 to C3 through equation (1), R, G1, G2, and B RAW data will be restored from the four channels C0 to C3 in accordance with an inverse transform process corresponding to equation (1). The foregoing has described the configuration and processing details of the RAW data decoding unit 103D according to the embodiment.

A quantization parameter generation process by the quantization parameter generating unit 203 according to the embodiment will be described next. The quantization parameter generating unit 203 according to the present embodiment generates the first quantization parameters common to all channels and all sub-bands, and then generates the individual second quantization parameters for each of the channels and sub-bands from the first quantization parameters. The quantization parameter generating unit 203 first generates the first quantization parameters common for all channels and all sub-bands by carrying out the quantization parameter generation process pertaining to code amount control in predetermined units of sub-band data, on the basis of a target code amount set in advance before encoding.

The present embodiment describes a case in which the quantization parameter generating unit 203 does not generate the first quantization parameters directly, but rather in two stages. First, the quantization parameter generating unit 203 generates quantization parameters common for all channels and all sub-bands in predetermined units of lines for each instance of sub-band data (third quantization parameters). The predetermined lines are then divided into units called "segments", and the first quantization parameters are generated by correcting the third quantization parameters in accordance with image quality properties of the sub-band data in the segments. The sequence for generating the first quantization parameters will be described in detail next.

Figure 5:
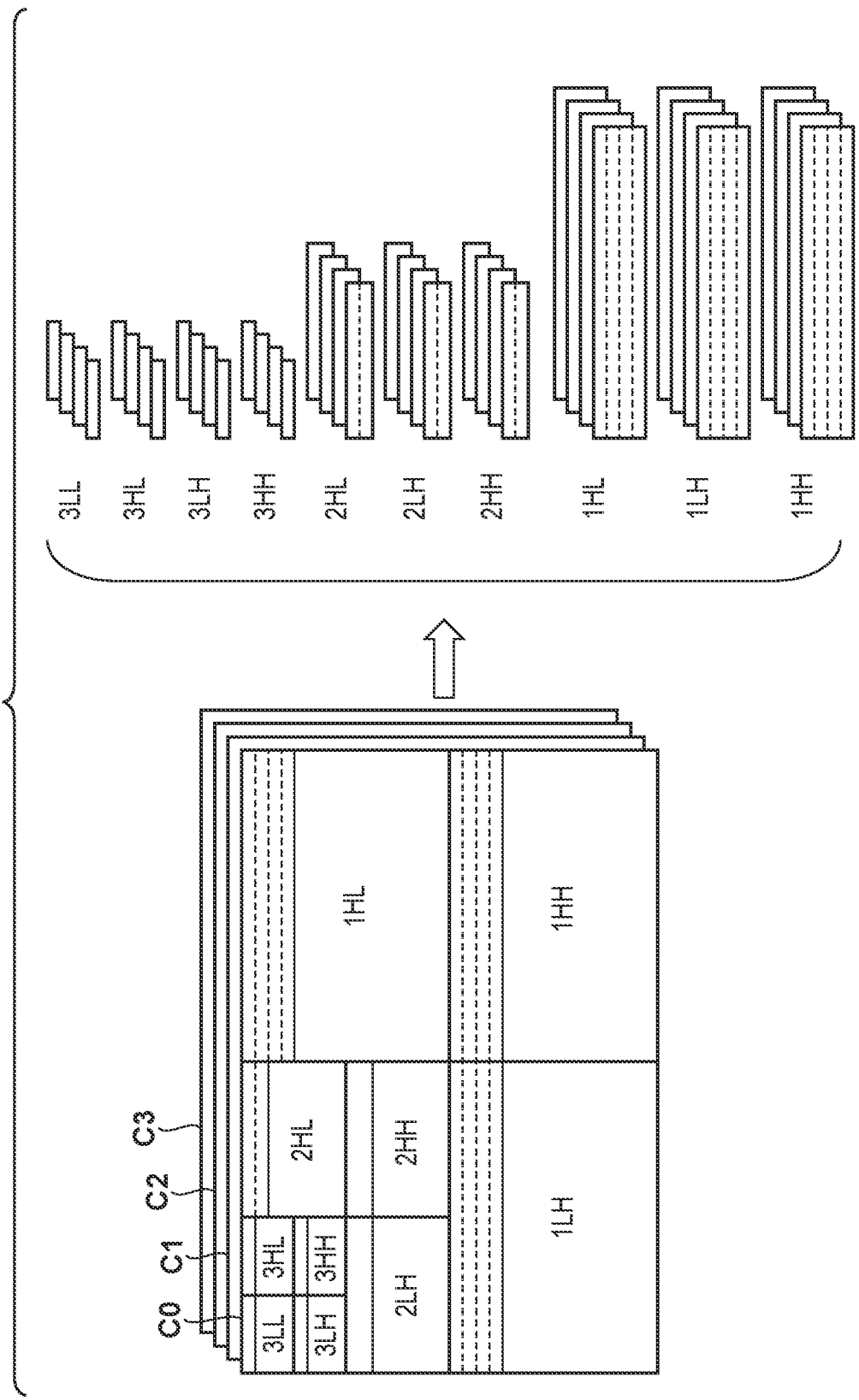
FIG. 5 is a diagram illustrating an example of units of quantization control according to an embodiment.

FIG. 5 illustrates units for evaluating a code amount pertaining to code amount control and updating quantization parameters, in a case where each channel is divided into sub-bands at lev=3. Sub-band data of N (where N is an integer) lines, in the vertical direction, of the level 3 sub-bands {3LL,3HL,3LH,3HH} of the four channels C0 to C3, 2×N lines, in the vertical direction, of the level 2 sub-bands {2HL,2LH,2HH}, and 4×N lines, in the vertical direction, of the level 1 sub-bands {1HL,1LH,1HH}, are taken together as a single unit of processing (a first unit of processing). As illustrated in FIG. 5, the first unit of processing is set as a region (a band) obtained by dividing the sub-bands by every predetermined number of lines in the vertical direction. FIG. 5 illustrates a case where N=1 in particular.

A person skilled in the art will be able to easily understand that the coefficients of the sub-bands on the right side in FIG. 5 express coefficients for the same regions in the encoded image. A collection of the coefficients indicated on the right side in FIG. 5 will be called a "band" hereinafter.

The quantization parameter generating unit 203 compares the target code amount and the generated code amount corresponding to the band (the first unit of processing), repeatedly carries out feedback control so as to bring the generated code amount closer to the target generated code amount in the next band, and generates the third quantization parameters (QpBr) common for all channels and all sub-bands. In other words, when the number of bands is Bn, QpBr(0), QpBr(1), QpBr(2), and so on up to QpBr(Bn−1) are found. If code amount control is not to be carried out on the RAW data within the screen, the QpBr common for all channels and all sub-bands may be set or generated so as to be fixed throughout the entire screen regardless of the unit of code amount control described above. The code amount control at this time can be executed according to the following equation (4).

$$QpBr(i)=QpBr(0)+r\times\Sigma\{S(i-1)-T(i-1)\} \quad (4)$$

QpBr(0): initial quantization parameters of first band
QpBr(i): quantization parameters for ith band (i>0)
r: control sensitivity
S(i): code amount of encoded data generated in ith band
T(i): target code amount for ith band
Note that when the number of bands included in a single frame is represented by M and the target code amount for a single frame is represented by T, T(i)=T/M. Although the ith target code amount T(i) is set to T(i)=T/M in the present embodiment, the target code amount may be set using a different method.

In equation (4), the initial quantization parameters QpBr(0) set for the first band among the bands (the first units of processing) set for the sub-band data are taken as a reference, and those initial quantization parameters are adjusted in accordance with the magnitude of a difference between the generated code amount and the target code amount. Specifically, the values of the initial quantization parameters are adjusted so as to reduce a code amount difference between the total code amount generated from the first band on (a total generated code amount) and a total of the corresponding target code amount (a total target code amount), and the third quantization parameters are set for the band to be processed. Parameters determined by the quantization parameter generating unit 203 on the basis of a compression rate or the like can be used as the initial quantization parameters set for the first band.

After the third quantization parameters (QpBr) have been generated for each band in this manner, the quantization parameter generating unit 203 further finely divides (segments) the bands, adjusts the third quantization parameters (QpBr) in accordance with an image quality evaluation result for the sub-band data in each segment, which is a second unit of processing, and generates the first quantization parameters (QpBs). This makes it possible to generate quantization parameters pertaining to image quality control for adjusting the strength of quantization in accordance with the properties of the RAW data.

Figure 6A:
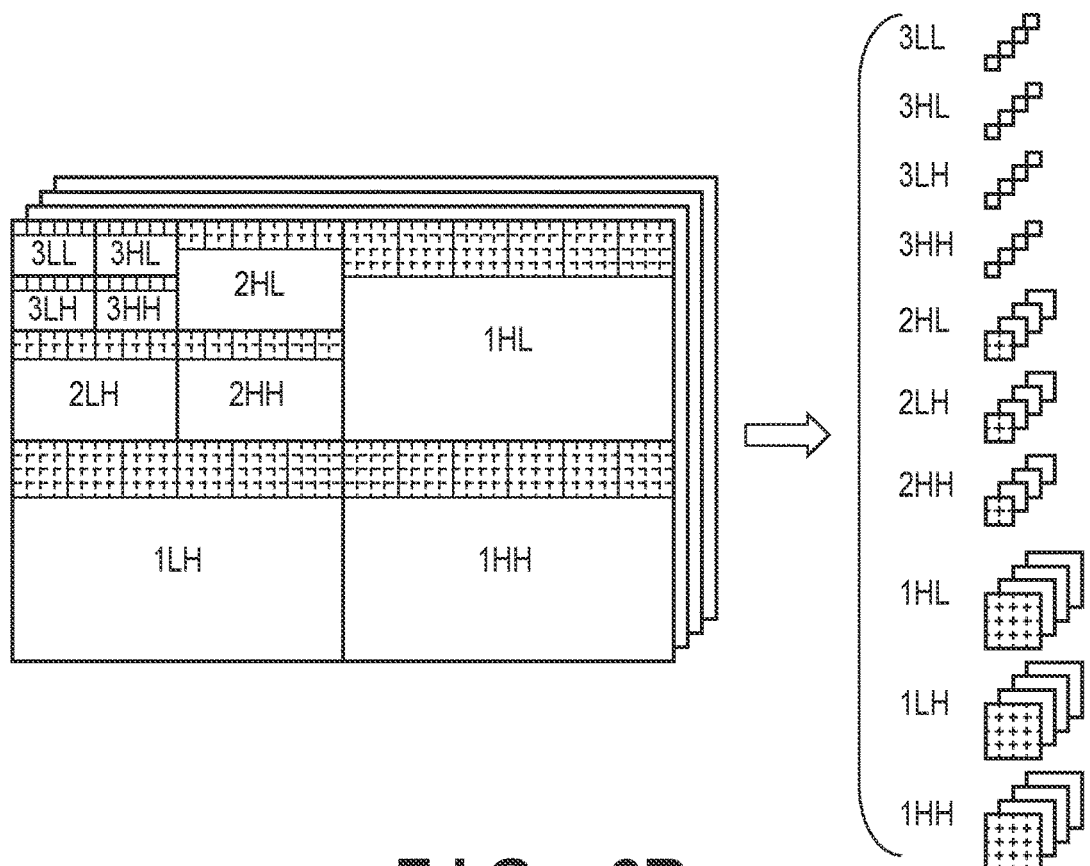
FIGS. 6A and 6B are diagrams illustrating an example of units of quantization control based on image quality properties according to an embodiment.

FIG. 6A illustrates the second unit of processing (segment) for evaluating sub-band data pertaining to image quality control and updating quantization parameters, when each channel has been divided into sub-bands as lev=3. In each segment, for all channels, the level 3 sub-bands {3LL, 3HL,3LH,3HH} have M×N (where M and N are both integers) in both the horizontal and vertical directions, the level 2 sub-bands {2HL,2LH,2HH} have (2×M)×(2×N) in both the horizontal and vertical directions, and the level 1 sub-bands {1HL,1LH,1HH} have (4×M)×(4×N) in both the horizontal and vertical directions.

The segment illustrated here as the second unit of processing is obtained by dividing the band, which serves as the first unit of processing, in the horizontal direction. In the present embodiment, the segmenting is carried out so that there are uniform numbers of segments in the sub-bands. If M=1 and N=1, the segment can be thought of as the result of dividing a band corresponding to level 1 into four pixel units in the horizontal direction. The quantization parameter generating unit 203 generates the first quantization parameters for each segment by correcting the third quantization parameters QpBr, calculated for each band, in accordance with the image quality properties for each segment.

The quantization parameters for the pth band are expressed as QpBr(p), and the quantization parameters of the qth segment within the pth band are expressed as QpBs(p,q). Assuming a single band includes Q segments, the parameters are found as QpBs(p,0), QpBs(p,1), and so on up to QpBs(p,Q−1). The values of the quantization parameters in the qth segment in the pth band are expressed using the third quantization parameters QpBr(p) in the pth band as a reference. A collection of the quantization parameters QpBs(p,q) corresponds to the first quantization parameters according to the embodiment.

Figure 6B:
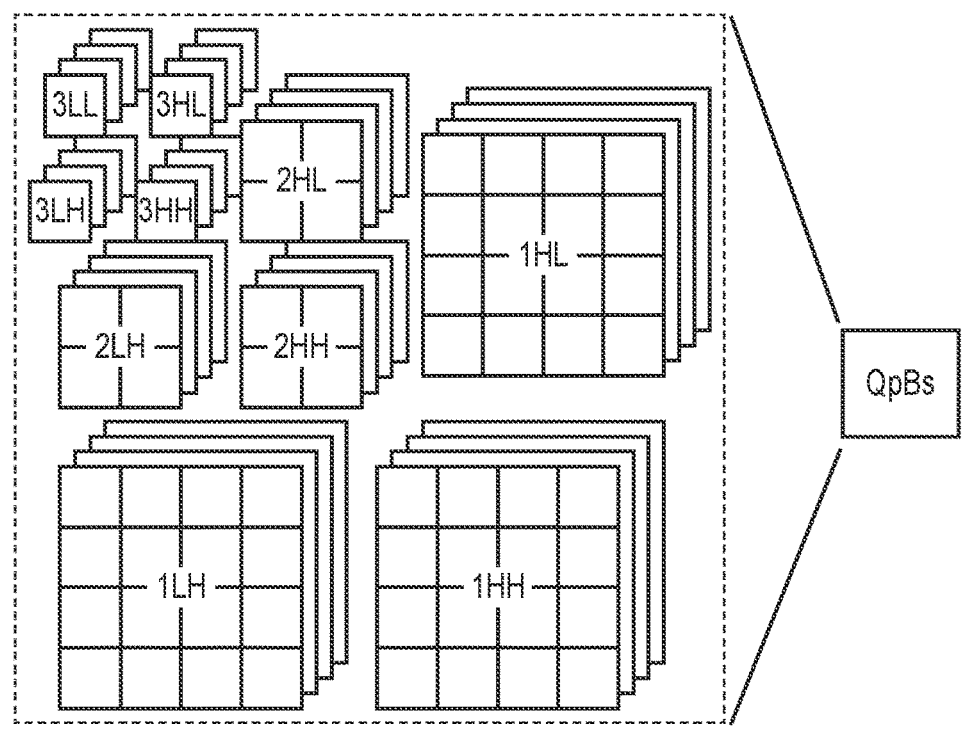

FIG. 6B illustrates the relationship between the first quantization parameters (QpBs(p,q)) and the sub-band data when M=1 and N=1. As illustrated here, a single first quantization parameter (QpBs) is generated for a plurality of sub-band data of each of channels, included in a single segment.

With respect to evaluating the image quality for each segment, for example, of the sub-band data included in each segment, the low-frequency sub-band 3LL is evaluated as a low-frequency component, and a high-frequency component is evaluated by the 1HL, 1LH, and 1HH sub-band data. At this time, feed-forward control may be carried out to adjust the gain and offset for the third quantization parameters (QpBr) by carrying out code amount control such that the quantization is finer when the amplitude of the low-frequency component is lower and the quantization is rougher as the amplitude of the high-frequency component is higher.

FIG. 7 is a flowchart illustrating an example of a process, executed by the quantization parameter generating unit 203, for adjusting the third quantization parameters (QpBr), based on image quality evaluation. Processing for the qth segment in the pth band will be described here. The processing of this flowchart is realized by, for example, one or more processors functioning as the quantization parameter generating unit 203 executing a corresponding program (stored in ROM or the like).

In step S701, the quantization parameter generating unit 203 makes a determination with respect to the low-frequency component of the qth segment in the pth band. Specifically, the quantization parameter generating unit 203 compares the transform coefficient of 3LL with a threshold Th1 set for use in the determination. If the transform coefficient of 3LL is less than or equal to the threshold ("YES" in step S701), the quantization parameter generating unit 203 moves the process to step S702. In step S702, the quantization parameter generating unit 203 sets a value obtained by reducing the third quantization parameters QpBr (p) of the band being processed as the first quantization parameters QpBs(p,q) of the segment of interest. For example, QpBr(p) is multiplied by a coefficient less than 1, or a predetermined value is subtracted from QpBr(p).

If the transform coefficient of 3LL is greater than the threshold Th1 in step S701 ("NO" in step S701), the quantization parameter generating unit 203 moves the process to step S703. In step S703, the quantization parameter generating unit 203 makes a determination with respect to the high-frequency component. Specifically, the quantization parameter generating unit 203 compares the average value of the transform coefficients of 1HL, 1LH, and 1HH in the segment of interest with a threshold Th2 set for use in the determination. If the average value is lower than the threshold Th2 ("NO" in step S703), the quantization parameter generating unit 203 moves the process to step S704. If the average value is greater than or equal to the threshold Th2 ("YES" in step S703), the quantization parameter generating unit 203 moves the process to step S705. In step S704, the quantization parameter generating unit 203 sets the value of QpBr(p) to the quantization parameters QpBs (p,q) of the segment of interest. Additionally, in step S705, the quantization parameter generating unit 203 sets a value obtained by increasing QpBr(p) to the quantization parameters QpBs(p,q) of the segment of interest. For example, the quantization parameters QpBs(p,q) of the segment of interest are set by multiplying QpBr(p) by one or more coefficients, or by adding a predetermined value to QpBr(p).

Through this, the first quantization parameters QpBs(p,q) of the qth segment in the pth band of interest are set. A single band includes Q segments, and thus the process illustrated in FIG. 7 is executed Q times for a single band. As a result, the first quantization parameters QpBs(p,0), QpBs(p,1), and so on up to parameters QpBs(p,Q−1) are set for all of the segments in the pth band.

Furthermore, the first quantization parameters QpBs(p,q) are set for all channels and all sub-bands by carrying out this process on all of the bands. If, for example, M=1 and N=1 as described above, the parameters correspond to 8×8 pixels in each channel, as illustrated in FIG. 8, and thus quantization control can be carried out in units of blocks of RAW data corresponding to 16×16 pixels of the original RAW data.

Next, a process of generating the individual second quantization parameters QpSb for each channel and each sub-band using the first quantization parameters QpBs will be described. As described above, in the present embodiment, a single first quantization parameter QpBs is generated for each segment. However, the quantization of each segment in each channel does not use QpBs as-is; rather, the quantization process is carried out having generated the second quantization parameters QpSb, which correspond to individual channels and segments, from QpBs.

The following will describe a method of generating the second quantization parameters QpSb for each channel and each sub-band from the first quantization parameters QpBs (p,q) for the qth segment in the pth band. Here, the first quantization parameters QpBs(p,q) for the qth segment in the pth band are expressed simply as QpBs.

The following equation (5) is a formula for generating QpSb.

$$QpSb[i][j]=QpBs \times \alpha[i][j]+\beta[i][j] \quad (5)$$

QpSb: individual second quantization parameters for each channel and each sub-band
QpBs: first quantization parameters common for all channels and all sub-bands
α: slope
β: intercept
i: channel index (0 to 3)
j: sub-band index (0 to 9)

Figure 9A:
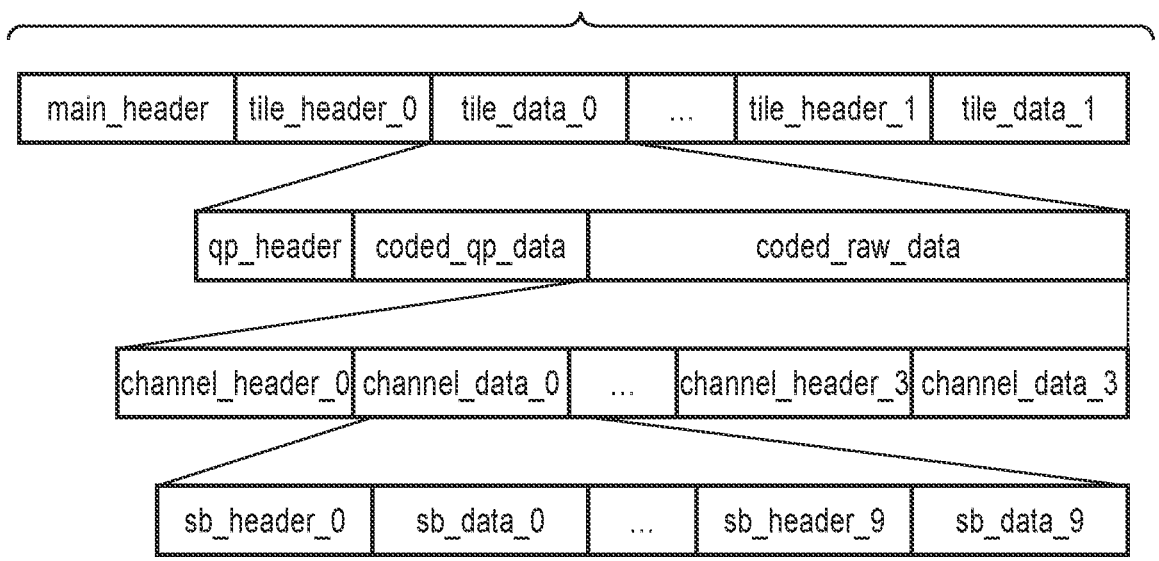
FIGS. 9A and 9B are diagrams illustrating an example of the data structure of encoded data according to an embodiment.
Figure 9B:
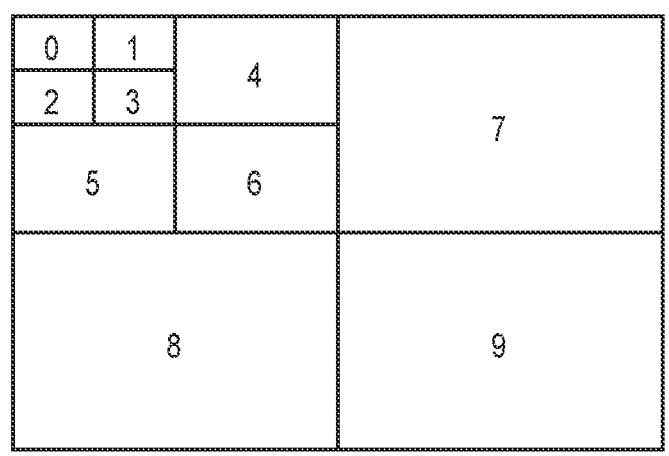

Here, FIG. 9B illustrates a relationship between the value of the sub-band index and the sub-band, for example. In other words, the higher the frequency component is, the greater the value becomes.

In equation (5), the slope a and intercept are coefficients (variables or conditional parameters) given individually for each channel and each sub-band, and can be set in advance. With respect to the channels C0 to C3, the value of a increases according to a relationship C0>C1=C2>C3, and the value of QpSb is greater the greater α is. For each of the sub-bands, the values of α and β are reduced to reduce the values of the quantization parameters in sub-bands of lower-frequency components, and the values of α and β are increased to increase the values of the quantization parameters in sub-bands of higher-frequency components.

The values of α[i][j] and β[i][j] are set in advance, but a plurality of combinations may be prepared in accordance with the compression rate that is set. For example, if the compression rate is high, information will be lost if the value of QpSb is too high, and thus the values of α and β can be adjusted to be on the lower side so that QpSb does not become too high.

Thus the second quantization parameters QpSb are generated by correcting the first quantization parameters QpBs using individual weighting coefficients α and β for each channel and each sub-band, which makes it possible to carry out quantization control flexibly for each channel and each sub-band. Using the second quantization parameters QpSb for each channel and each sub-band generated on the basis of equation (5), the quantization units 204 quantize the transform coefficients obtained from the frequency transform units 202.

The method by which the RAW data decoding unit 103D generates the second quantization parameters QpSb can be carried out according to the above-described equation (5). At that time, the values of the first quantization parameters QpSr, α, and β are provided from the quantization parameter decoding unit 212.

The sub-band data of each channel, encoded by the RAW codec 103 as described above, as well as the first quantization parameters QpBs and α and β, are multiplexed by the record-processing unit 106 on the basis of a predetermined data format and recorded as encoded data. FIG. 9A illustrates an example of a data structure when recording the encoded data. As illustrated in FIG. 9A, the encoded data has a hierarchical structure, starting with "main_header", which expresses information pertaining to the encoded data as a whole. Data can be stored in units of tiles, using a "tile_header" and "tile_data", under the assumption that the RAW data is divided into tiles in units of a plurality of pixel blocks and encoded in such a state. Although the foregoing describes the RAW data as being directly encoded in units of channels and sub-band data, the encoding is not limited to tiles, and a case where a predetermined grouping in the RAW data is used as a unit can be applied in the present invention. In other words, even if the RAW data is divided into tiles and each tile is encoded in units of channels and sub-band data, the same processing may be executed in units of tiles obtained by dividing the RAW data into a plurality of pieces. In this case, the sub-band data of each channel and the first quantization parameters QpBs are encoded in units of tiles, and are included in the encoded data. There is only one "tile_header" and "tile_data" if tile division is not carried out.

The "tile_data" includes the following elements. First, "qp_header", which expresses information pertaining to the encoded first quantization parameters QpBs, and "coded_qp_data", which is the encoded first quantization parameters themselves, are provided. "coded_raw_data" is arranged next in units of channels, and holds the number of channels' worth of encoded data, in the order of "channel_header", which expresses information pertaining to that channel, and "channel_data", which is the actual data of that channel. "channel_data" is configured as a collection of encoded data for each sub-band, with "sb_header" which expresses information pertaining to each sub-band, and "sb_data", which is the encoded data for each sub-band, being arranged in sub-band index order. The sub-band index is as illustrated in FIG. 9B.

The syntax elements in each piece of header information will be described next with reference to FIGS. 10A to 10E. As illustrated in FIG. 10A, "main_header" is constituted of the following elements. "coded_data_size" expresses the overall data amount of the encoded data. "width" expresses a width of the RAW data. "height" expresses a height of the RAW data. "depth" expresses a bit depth of the RAW data. "channel" expresses the number of channels when encoding the RAW data. "type" expresses the type of channel transform. "lev" expresses the sub-band level of each channel.

As illustrated in FIG. 10B, "tile_header" is constituted of the following elements. "tile_index" expresses an index of the tiles for identifying tile division positions. "tile_data_size" expresses the amount of data included in the tile. "tile_width" expresses the width of the tile. "tile_height" expresses the height of the tile.

As illustrated in FIG. 10C, "qp_header" is constituted of the following elements. "qp_data_size" expresses the data amount of the encoded first quantization parameters. "qp_width" expresses the width of the first quantization parameters, i.e., the number of first quantization parameters in the horizontal direction corresponding to the RAW data. "qp_height" expresses the height of the first quantization parameters, i.e., the number of first quantization parameters in the vertical direction corresponding to the RAW data.

As illustrated in FIG. 10D, "channel_header" is constituted of the following elements. "channel_index" expresses an index of the channels for identifying the channels. "channel_data_size" expresses the amount of data in the channel.

As illustrated in FIG. 10E, "sb_header" is constituted of the following elements. "sb_index" expresses a sub-band index for identifying the sub-bands. "sb_data_size" expresses an amount of encoded data in the sub-band. "sb_qp_a" expresses the value of $\alpha$, indicated in equation (5), for generating the quantization parameters for each sub-band. "sb_qp_b" expresses the value of $\beta$, indicated in equation (5), for generating the quantization parameters for each sub-band.

According to the above-described embodiment, rather than recording quantization parameters for all channels and all sub-bands, quantization parameters common for all channels and all sub-bands are recorded, and the quantization parameters for each of the channels and sub-bands can then be generated from the common quantization parameters. An effect of reducing the amount of data of the quantization parameters, which will be described below, can thus be achieved.

Consider a comparison between the data amount when recording all of the individual quantization parameters for each channel and each sub-band (a conventional example) and the data amount when recording quantization parameters common for all the channels and sub-bands (the present embodiment). Here, a single quantization parameter is recorded for each sub-band from level 1 to level 3. As such, the data size of the quantization parameters recorded for a single segment will be (1×4 sub-bands+1×3 sub-bands+1×3 sub-bands)×4 channels, for a total of 40. On the other hand, only one common quantization parameter is required, and thus using the common quantization parameter as the quantization parameter to be recorded makes it possible to reduce the quantization parameter size to 1/40.

Figure 11:
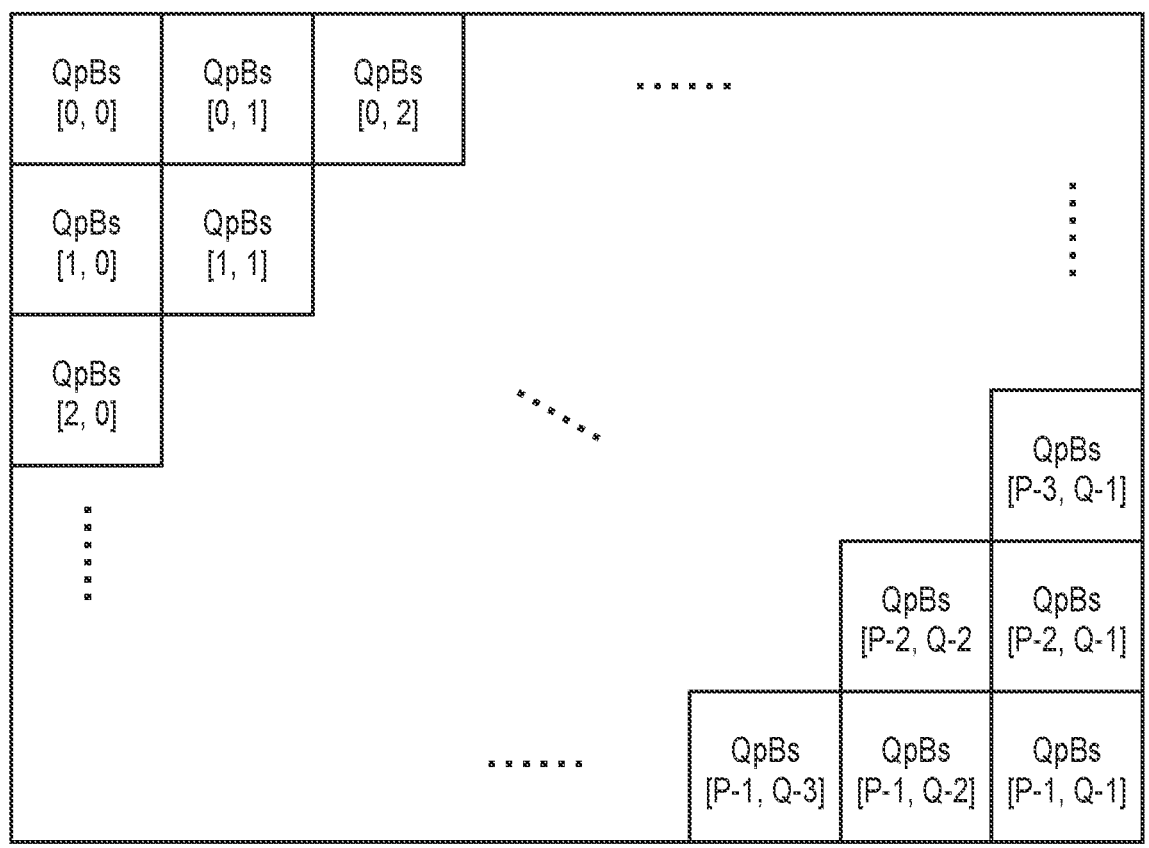
FIG. 11 is a diagram illustrating an example of mapping common quantization parameters to a two-dimensional coordinate system according to an embodiment.

FIG. 11 illustrates the common first quantization parameters QpBs to be recorded when there are P bands and Q segments included in a single band. The first quantization parameters QpBs can, as illustrated in FIG. 11, be handled as screen data mapped to a two-dimensional coordinate system, and thus the data amount of the quantization parameters can be reduced further by applying the same predictive differential encoding method (MED prediction) used when encoding the quantization parameters. Note that, in FIG. 11, QpBs[p, q] represents the common quantization parameters assigned to each segment. p can take on a value from 0 to a segment division number P in the vertical direction, and q can take on a value from 0 to a segment division number Q in the horizontal direction. Each value of [p,q] corresponds to the position of that segment in the sub-band.

As described thus far, when RAW data is transformed into a plurality of channels and sub-band division is carried out in units of channels, individual quantization parameters for each channel and each sub-band can be generated in units of segments by using quantization parameters common for all channels and all sub-bands and a weighting function. This makes it possible to use predictive encoding to encode the common quantization parameters as two-dimensional data, which greatly reduces the data amount of the quantization parameters while realizing flexible quantization control. This in turn makes it possible to record RAW data at high quality and at a compact size.

Second Embodiment

A second embodiment will be described next. The image capturing apparatus according to the present second embodiment can have the same configuration as the image capturing apparatus according to the first embodiment. However, the units for which the first quantization parameters are generated by the quantization parameter generating unit 203 of the RAW codec 103, and the process for generating the individual second quantization parameters for each channel and each sub-band, are different. Configurations that are the same as in the first embodiment will not be described in the present embodiment, with focus being given primarily to configurations pertaining to the different method of generating the quantization parameters.

Figure 12A:
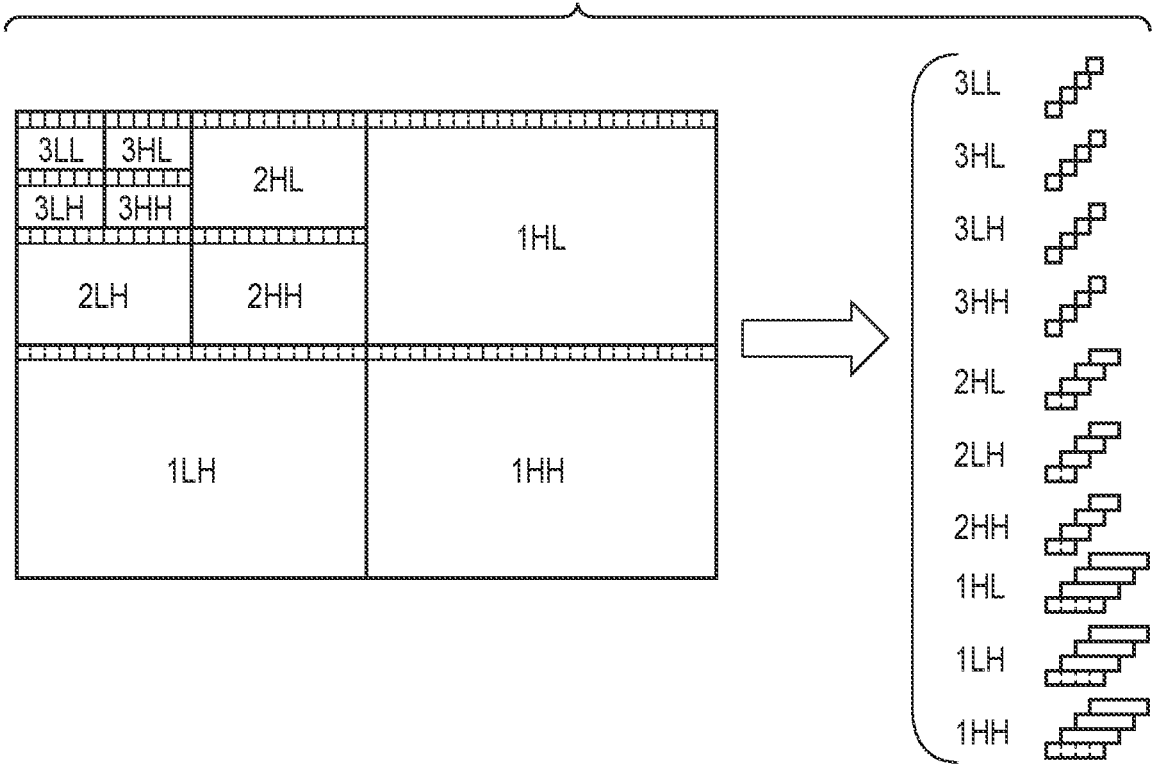

FIG. 12A illustrates units for evaluating sub-band data pertaining to image quality control and updating quantization parameters in a case where each channel is divided into sub-bands at lev=3. The common first quantization parameters (QpBs) are generated for the sub-band data corresponding to (1×M)×1 (where M is an integer) lines in both the horizontal and vertical directions for the level 3 sub-bands (3LL, 3HL, 3LH, and 3HH), (2×M)×1 lines in both the horizontal and vertical directions for the level 2 sub-bands (2HL, 2LH, and 2HH), and (4×M)×1 lines in both the horizontal and vertical directions for the level 1 sub-bands (1HL, 1LH, and 1HH), for all channels.

Figure 12B:
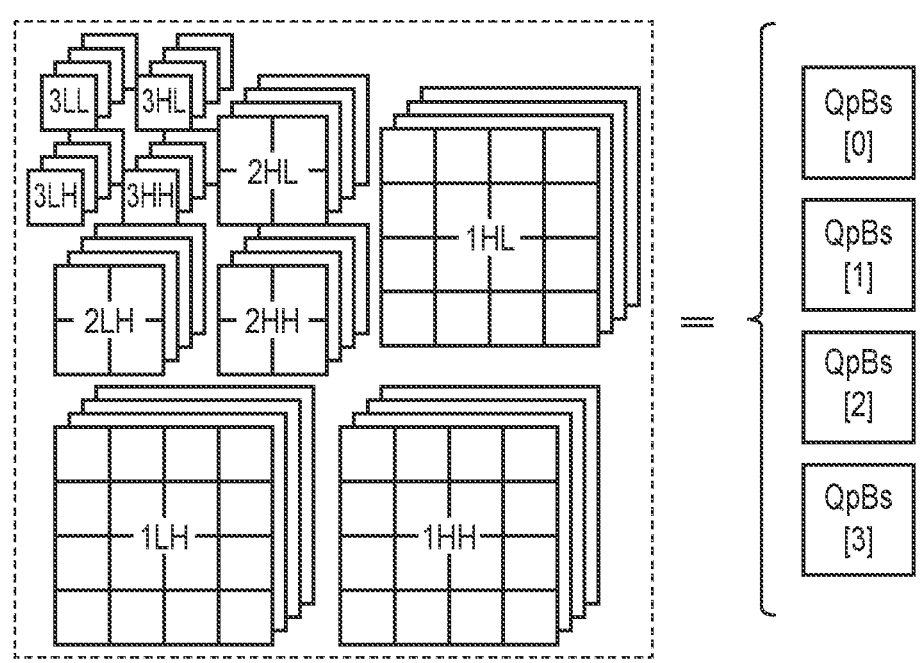

Compared to the segments pertaining to image quality control illustrated in FIG. 6A, in FIG. 12A, the segment size in level 1 is ¼ in the vertical direction. Accordingly, the relationship between the first quantization parameters (QpBs) and the sub-band data when, for example, M=1 is as illustrated in FIG. 12B. Here, the segment size in level 1 is 4×1, and thus four first quantization parameters (QpBs) are present upon transformation into 4×4 segments. This makes it possible to carry out finer quantization control in the vertical direction than in the first embodiment. Note that the control can likewise be made finer in the horizontal direction as well.

Although the method of evaluating the sub-band data with respect to image quality control is substantially the same as in the first embodiment, the target of evaluation for the low-frequency component is not 3LL in the present second embodiment, but is rather the sub-band data corresponding to 1LL, which is generated intermediately in the process of sub-band division. The flow of processing is also similar to that of the flowchart illustrated in FIG. 7, but the subject of determination in step S701 is the transform coefficient of 1LL rather than 3LL.

In the present second embodiment, if the transform has resulted in, for example, 4×4 segments for M=1, the number of quantization parameters in units of lines, which are the subject of image quality control, will differ between level 1 and level 3. As such, the first quantization parameters QpBs cannot be used in common from level 1 to level 3 as in the first embodiment. Accordingly, in the present second embodiment, QpLv1 to QpLv3 are generated for corresponding levels from the four QpBs in level 1, on the basis of the following equation 6, and the individual second quantization parameters QpSb corresponding to each channel and each sub-band are generated using QpLv1 to QpLv3.

$$QpLv1[m]=QpBs[m]$$

$$QpLv2[n]=(QpBs[n\times 2]+QpBs[n\times 2+1])>>1$$

$$QpLv3[n]=(QpBs[0]+QpBs[1]+QpBs[2]+QpBs[3])>>2 \quad (6)$$

m: line number (0 to 3) for level 1 sub-band in units of segments
n: line number (0 to 1) for level 2 sub-band in units of segments
>>x: x bit shift to the right (lower significance)

Although the level 2 and level 3 quantization parameters are calculated from the average value of the corresponding QpBs as indicated in equation (6), the maximum-value or minimum-value QpBs may be selected. Alternatively, QpLv3 may be calculated as the average value, the maximum value, or the minimum value of QpLv2. Ultimately, the second quantization parameters (QpSb) of each channel and sub-band ultimately used in the quantization may be calculated by replacing QpBs in the above-described equation 5 with QpLv1 to QpLv3, and the relationship between the quantization parameters and the sub-bands being quantized becomes as illustrated in FIG. 12C.

The degree to which the data amount of the recorded quantization parameters is reduced according to the present second embodiment will be described next with reference to FIGS. 13A and 13B. With respect to FIG. 13A, assuming, in the conventional example serving as a comparison, that the quantization parameters are recorded in units of single lines in each level, if the quantization parameters for the level 3 sub-bands are taken as 1, twice the quantization parameters will be recorded in level 2 as in level 3, and four times the quantization parameters will be recorded in level 1 as in level 3. As such, the data size of the quantization parameters recorded for a single segment will be (1×4 sub-bands+2×3 sub-bands+4×3 sub-bands)×4 channels, for a total of 88. On the other hand, in the case of FIG. 13B, the common quantization parameters correspond to the level 1 sub-band, for a number of 4, and thus using the common quantization parameters as the quantization parameters to be recorded makes it possible to reduce the quantization parameter size to 1/22.

Thus even when carrying out finer quantization control in the vertical direction as in the present embodiment, a sufficient data reduction effect can be achieved as compared to the conventional example. As in the first embodiment, it is possible, in the present embodiment, to use predictive encoding to encode the common quantization parameters as two-dimensional data, which greatly reduces the data amount of the quantization parameters while realizing flexible quantization control. This in turn makes it possible to record RAW data at high quality and at a compact size.

Third Embodiment

Figure 23A:
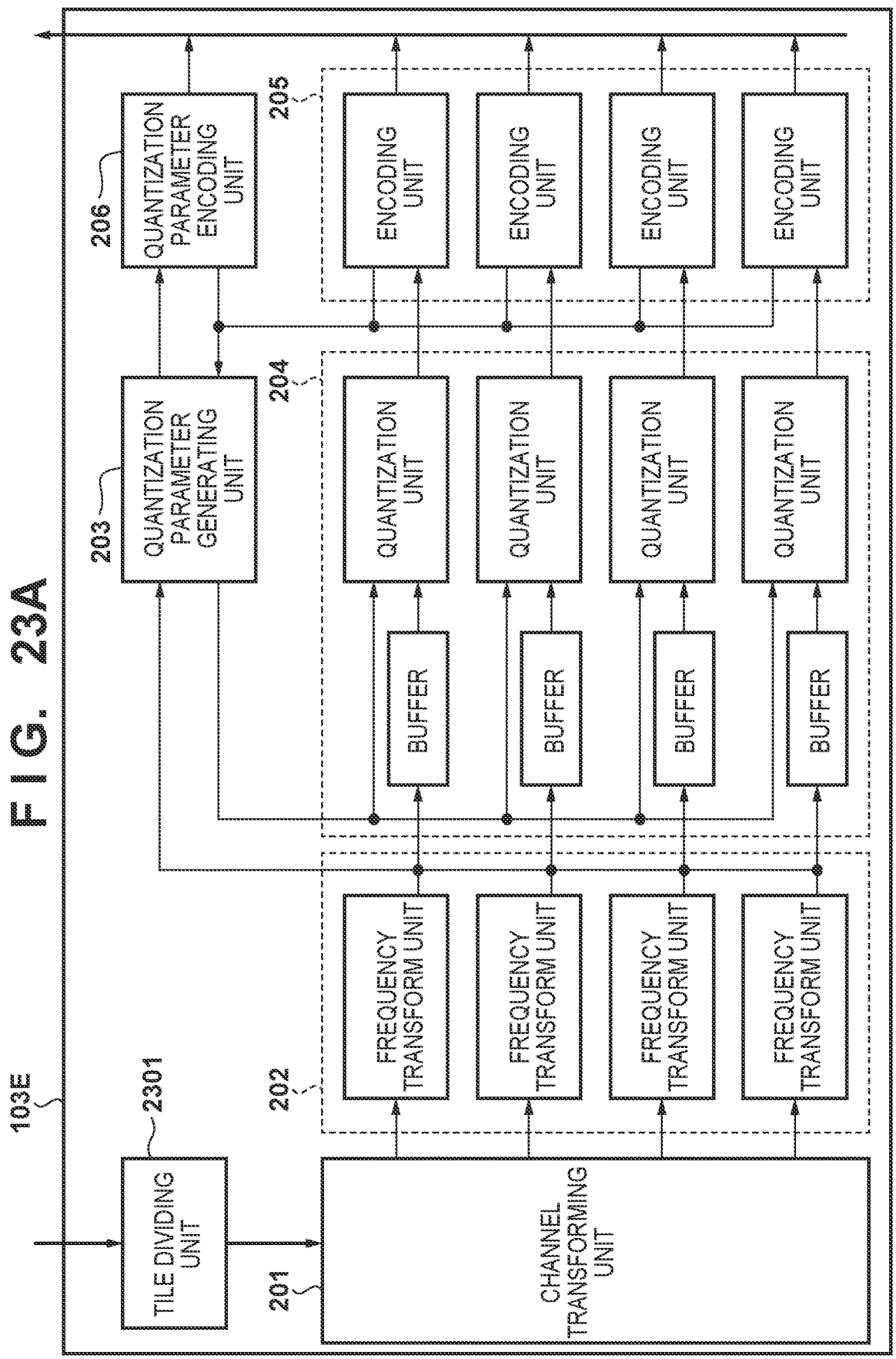
FIGS. 23A and 23B are block diagrams illustrating a RAW codec according to the third and fourth embodiment.
Figure 23B:
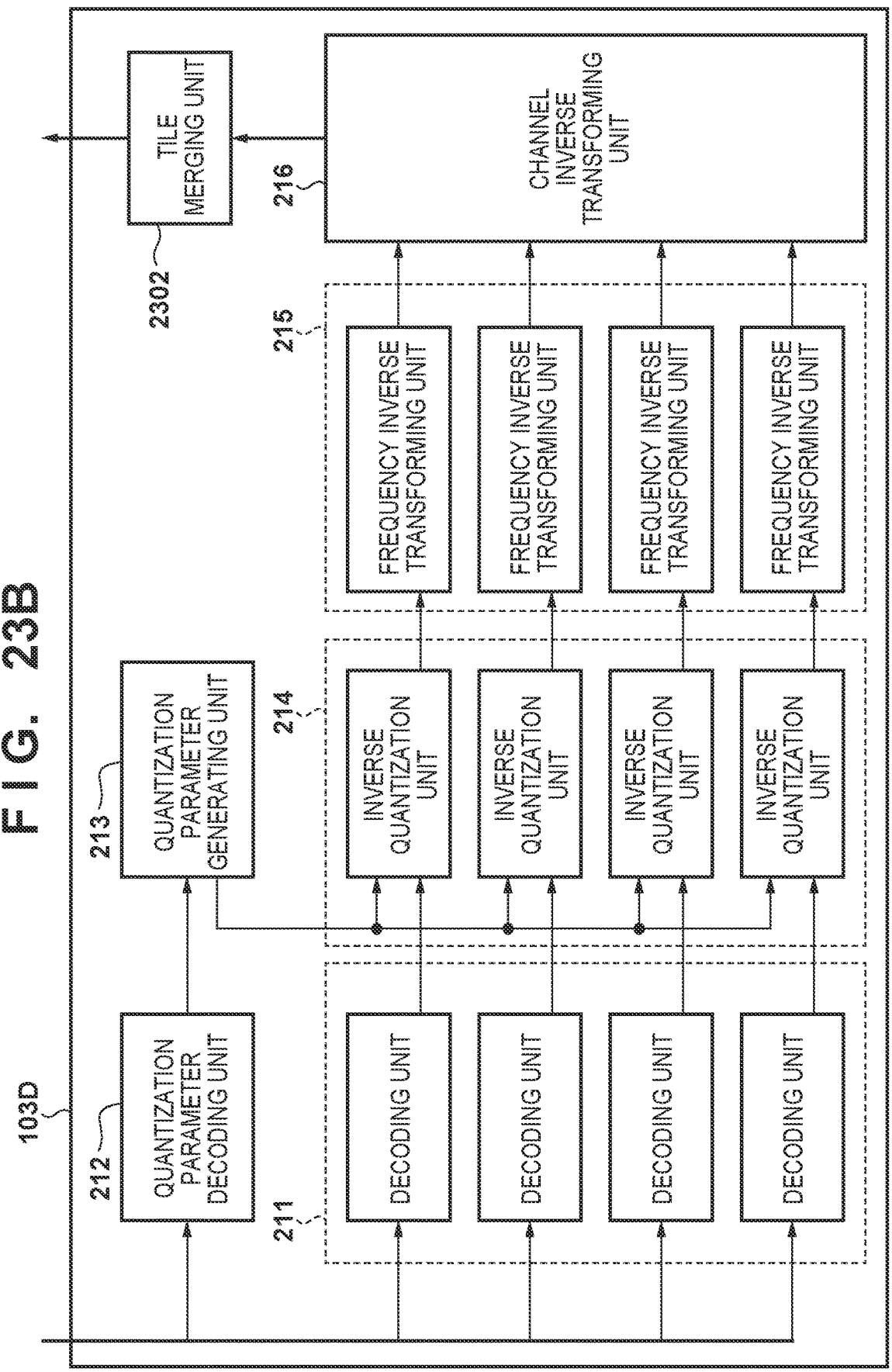

A third embodiment of the invention will be described next. FIG. 23A illustrates the configuration of the RAW data encoding unit 103E of an image capturing apparatus according to the present third embodiment, and FIG. 23B illustrates the configuration of the RAW data decoding unit 103D. The differences from FIGS. 2A and 2B are that a tile dividing unit 2301 has been added to the RAW data encoding unit 103E, and a tile merging unit 2302 has been added to the RAW data decoding unit 103D. The rest is assumed to be the same as in the second embodiment.

The tile dividing unit 2301 divides a single frame of input RAW image data into a pre-set number of tiles, and supplies the tiles one by one to the channel transforming unit 201. However, when supplying the RAW image data of a tile of interest obtained from the division to the channel transforming unit 201, the tile dividing unit 2301 according to the embodiment also supplies, to the channel transforming unit 201, pixel data located within a predetermined distance from the boundaries with the tile of interest in adjacent tiles. The encoding process following the channel transforming unit 201 is the same as in the above-described first and second embodiments, and thus the present third embodiment differs in that the encoded data of a plurality of tiles serves as the encoded data of the image of a single frame. Additionally, the frequency transform units 202 also subjects data near the boundaries within adjacent tiles to the frequency transform (wavelet transform), the size of the sub-band data is greater than when subjecting only the tile of interest to a frequency transform. Additionally, the tile merging unit 2302 concatenates the images of each tile obtained through decoding to generate and output a single frame of RAW image data.

The wavelet transform filters used by the frequency transform units 202 in the present third embodiment are assumed to be the same five-tap lpf and three-tap hpf as in the first embodiment.

To simplify the descriptions, a case where a wavelet transform is carried out once will be considered here. FIG. 14 illustrates a lifting structure through which the frequency transform unit 202 executes a single discrete wavelet transform in the horizontal direction, in the case where a RAW image is divided into two tiles in the horizontal direction.

In FIG. 14, reference signs a to i indicate one line of data near a tile boundary. The drawing illustrates an example in which the tile boundary is located between data d and e, data e to i belong to a tile of interest to be encoded through the discrete wavelet transform, and data a to d belong to an adjacent tile located to the left. The encoding process according to the embodiment is assumed to be carried out in raster scan order, in units of tiles.

When carrying out a single discrete wavelet transform using a five-tap lpf and a three-tap hpf, transform coefficients indicating high-frequency components are calculated by referring to three consecutive pieces of data. b', d', f', and h' in the drawing indicate high-frequency component transform coefficients for resolution level 1 (1H).

Likewise, transform coefficients indicating low-frequency components are calculated by referring to five consecutive pieces of data. c", e", and g" in the drawing indicate low-frequency component transform coefficients for resolution level 1 (1L).

Here, consider a case of decoding the data "e", which is closest to the tile boundary of the tile of interest, when encoding by executing a single wavelet transform. As illustrated in the drawing, three transform coefficients, namely the high-frequency transform coefficients d' and f' and the low-frequency transform coefficient e", are sufficient to decode the data "e". Of these, the transform coefficient generated by referring to data half or more of which is in the adjacent tile is the high-frequency transform coefficient d'. The high-frequency transform coefficient d' is calculated from a total of three pieces of data, namely data e within the tile of interest and data c and d of the adjacent tile. Accordingly, the number of pieces of referred data in the tile adjacent to the left is "2" when carrying out a single discrete wavelet transform.

In this manner, if, when encoding the tile of interest, there is a tile adjacent to the left thereof and only a single discrete wavelet transform is to be carried out, the frequency transform unit 202 inputs the data c and d, which are two pixels away from the boundary with the tile adjacent to the left, in addition to the tile of interest, and carries out the discrete wavelet transform.

Here, because the tile adjacent to the left has been encoded immediately before the tile of interest, the high-frequency transform coefficient d' has already been calculated when encoding the tile adjacent to the left, and that high-frequency transform coefficient d' may therefore be used. However, it is not necessarily the case that the high-frequency transform coefficient d' of the tile adjacent to the left is quantized, and the quantization parameters used for that quantization are the same as the quantization parameters for the tile of interest. Accordingly, in the present embodiment, the tile of interest is encoded by carrying out a wavelet transform also on the data c and c which are located within two pixels from the tile boundary in the tile adjacent to the left.

Then, in addition to the transform coefficient obtained from the tile to be encoded, the frequency transform unit 202 takes the transform coefficient d' generated by referring to data, half or more of which is in the adjacent tile, as the transform coefficient for the discrete wavelet transform in the horizontal direction for one line of data near the tile boundary.

A decoding process when data has been encoded through the aforementioned discrete wavelet transform using a five-tap lpf and a three-tap hpf, using a lifting structure, will be described using FIG. 15.

FIG. 15 is a diagram illustrating a case where the frequency inverse transforming unit 215 carries out a discrete inverse wavelet transform with the coefficient generated through the discrete wavelet transform described using FIG. 14, using the lifting structure. d', e", f', and g" in FIG. 15 correspond to d', e", f', and g" in FIG. 14. In other words, d' and f' are high-frequency transform coefficients at resolution level 1 (1H), and e" and g" are low-resolution transform coefficients at resolution level 1 (1L). Of these, the transform coefficient d' is the transform coefficient generated by referring to data, half or more of which is in the adjacent tiles. The data e at the end of the tile to be encoded can be generated from the transform coefficients d', e", and f'.

Figure 16:
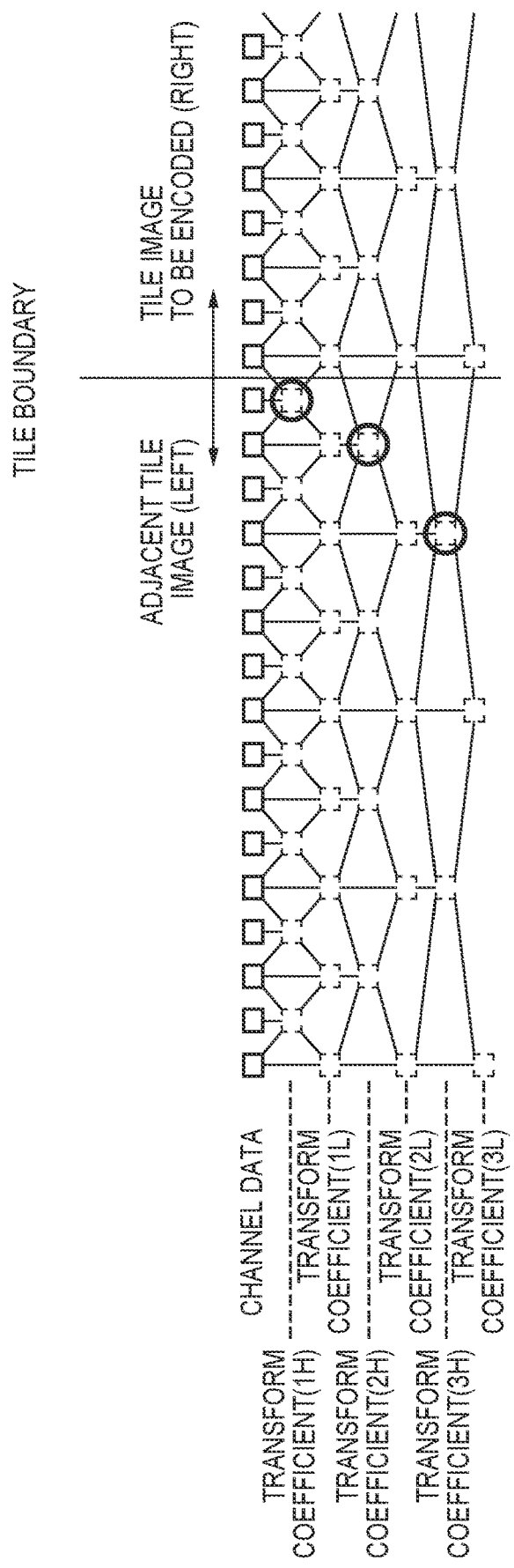
FIG. 16 is a diagram illustrating a method for executing a discrete wavelet transform according to the third embodiment.

However, in the embodiment, the wavelet transform is executed three times, and thus the descriptions will return thereto. FIG. 16 is a diagram illustrating an execution method when the frequency transform unit 202 executes three discrete wavelet transforms in the horizontal direction, in the case where a RAW image is divided into two tiles in the horizontal direction.

In FIG. 14, where a single discrete wavelet transform is executed, two pieces of data are input by referring to the adjacent tile in order to generate the transform coefficients necessary for decoding data within the tile to be encoded, as described above with reference to FIG. 14. On the other hand, when executing three discrete wavelet transforms, it is necessary to input 16 pieces of data, located within 16 pixels from the tile boundary in the adjacent tile, as illustrated in FIG. 16.

Of the transform coefficients necessary to decode the data located at the end of the tile to be encoded, the transform coefficients generated by referring to data, half or more of which is in the adjacent tile, are the transform coefficients in the circles illustrated in FIG. 16. These are, in other words, a total of three coefficients, namely one transform coefficient for resolution level 1 (1H), one transform coefficient for resolution level 2 (2H), and one transform coefficient for resolution level 3 (3H). As such, of the transform coefficients generated by referring to the data, half or more of which is in the adjacent tile, these three coefficients may be taken as the transform coefficients for the discrete wavelet transform in the horizontal direction for one line of data near the tile boundary.

The foregoing has described a case where the frequency transform unit 202 carries out the discrete wavelet transform in the horizontal direction when the RAW image is divided into two tiles in the horizontal direction, with reference to FIGS. 14, 15, and 16. However, the same applies when dividing the RAW image into two tiles in the vertical direction and the discrete wavelet transform is carried out in the vertical direction.

Additionally, the foregoing has described a one-dimensional discrete wavelet transform in the horizontal direction, with reference to FIGS. 14, 15, and 16. However, when the frequency transforming unit 202 carries out a two-dimensional discrete wavelet transform in the horizontal and vertical directions, the processing is as follows.

First, with respect to the processing in the horizontal direction, a discrete wavelet transform process is carried out in the vertical direction by referring to the data obtained from the tile of interest to be encoded and the adjacent tile as described earlier. Horizontal direction transform coefficients are then output to the extent necessary for decoding the data located at the end of the tile of interest.

Then, with respect to the processing in the vertical direction, the horizontal direction transform coefficients for the adjacent tile are input along with the horizontal direction transform coefficients for the tile of interest, and the discrete wavelet transform process is carried out in the vertical direction. As a result, the sub-band data is output to the extent necessary for decoding the data located at the end of the tile of interest.

Thereafter, the transform coefficients generated by referring to data, half or more of which is in the tile of interest, among the data necessary for the horizontal direction processing, and data, half or more of which is in the tile to be encoded, among the data necessary for the vertical direction processing, are defined as first transform coefficients, and the other sub-band data is defined as second transform coefficients.

In other words, the second transform coefficients are transform coefficients generated by referring to data, half or more of which is the channel data of the adjacent tile, in one of the horizontal direction processing and the vertical direction processing.

Figure 17A:
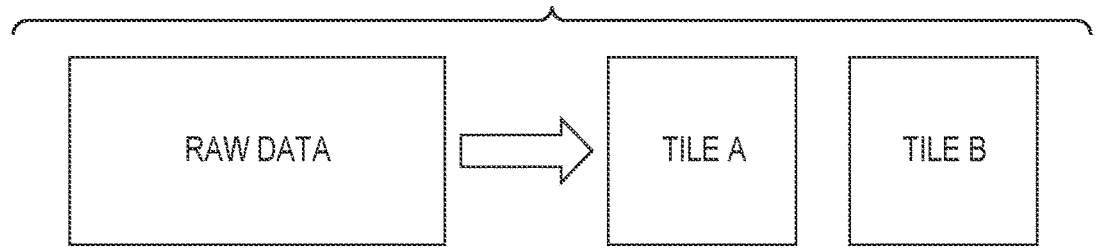
FIGS. 17A and 17B are diagrams illustrating frequency transform (sub-band division) according to the third embodiment.

FIG. 17A is a conceptual diagram illustrating a case where a RAW image has been divided into two tiles, namely left and right. Here, the left tile is tile A and the right tile is tile B, and it is assumed that tile B is the tile to be encoded.

Figure 17B:
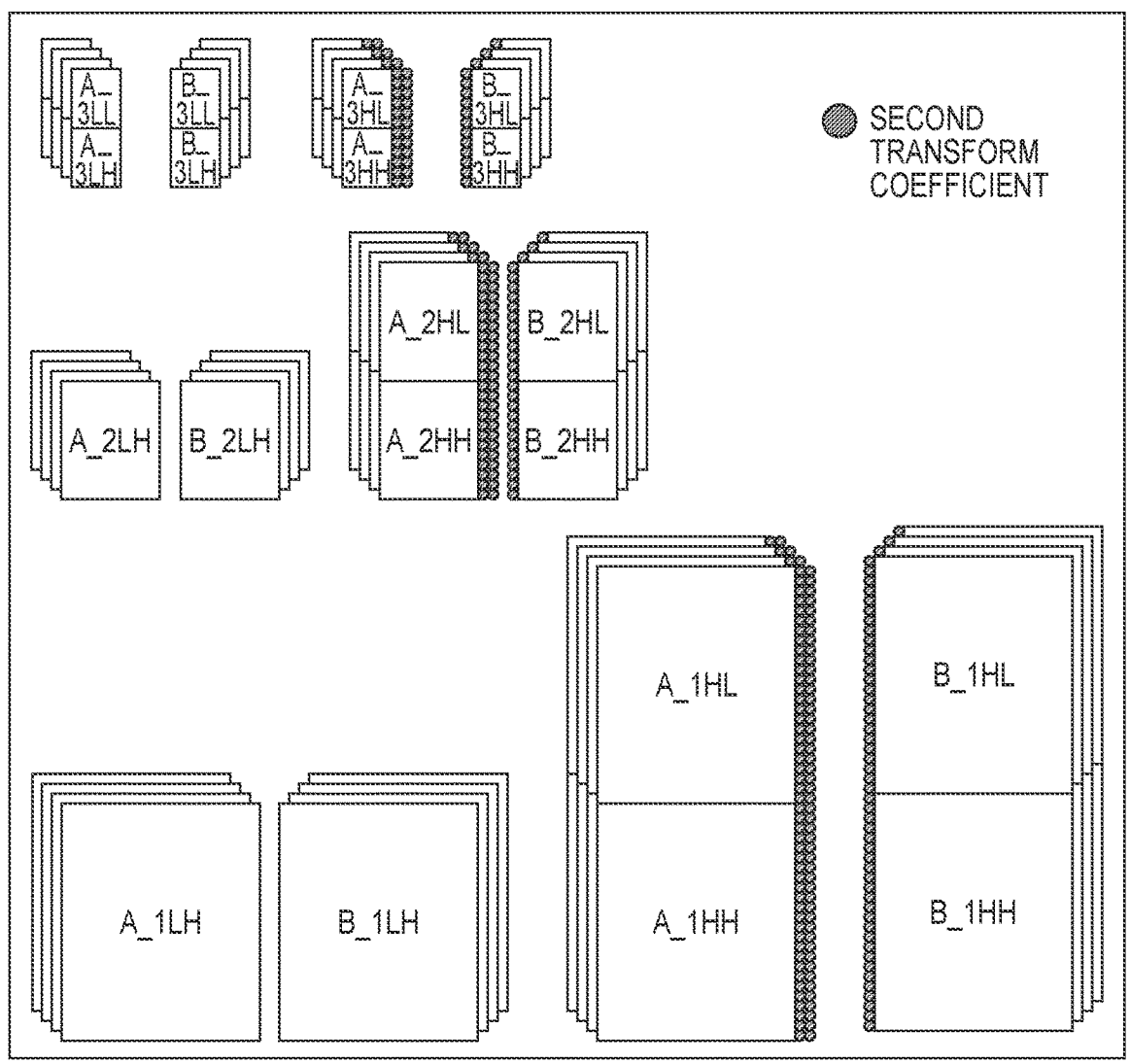

FIG. 17B illustrates the first transform coefficients and the second transform coefficients for tile A and tile B. Tile A indicates an example in which there is a tile adjacent to the right, and in the six sub-bands, namely 3HL/3HH/2HL/2HH/1HL/1HH, two second transform coefficients are present on the right side of the first transform coefficients.

Tile B indicates an example in which there is a tile adjacent to the left, and in the six sub-bands, namely 3HL/3HH/2HL/2HH/1HL/1HH, one second transform coefficient is present on the left side of the first transform coefficients.

Figure 18:
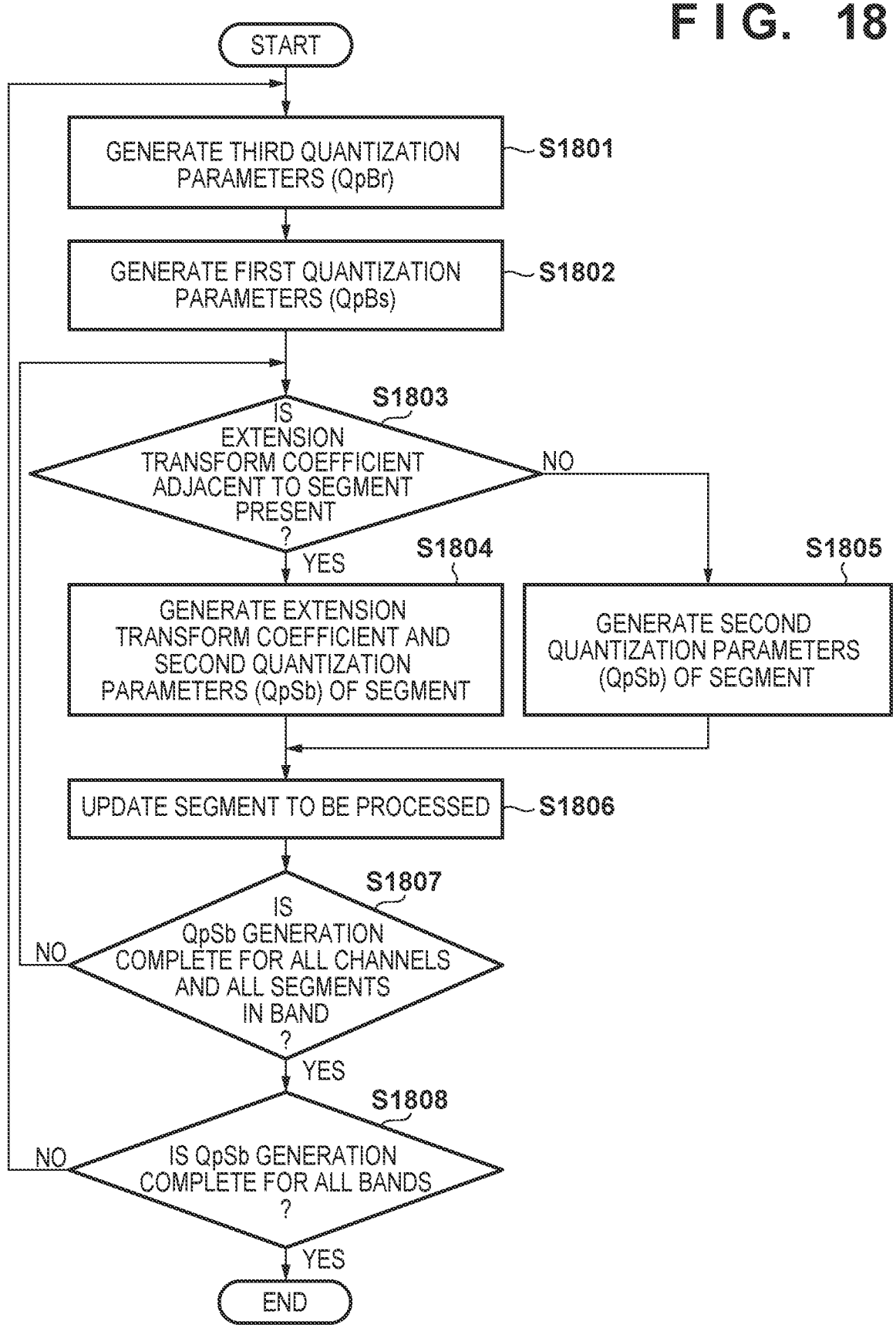
FIG. 18 is a sequence chart illustrating processing by a quantization parameter generating unit according to the third embodiment.

FIG. 18 is a sequence chart illustrating a process through which the quantization parameter generating unit 203 generates the second quantization parameters (QpSb) when a RAW image is divided into tiles.

Note that in the present embodiment, the segment division is carried out for the first transform coefficients, and the second transform coefficients are not included in the segments. Furthermore, it is assumed that the segments are divided according to the same sequence as in the first embodiment, and are thus the same as those in the first embodiment, regardless of whether or not the second transform coefficients are present.

In step S1801, the quantization parameter generating unit 203 generates the third quantization parameters (QpBr) for each band (first unit of processing).

In step S1802, the quantization parameter generating unit 203 generates the first quantization parameters (QpBs) by adjusting the third quantization parameters (QpBr) in accordance with the image quality evaluation result of the sub-band data for each segment, the segment being the second unit of processing.

In step S1803, the quantization parameter generating unit 203 makes a determination as to whether or not a second transform coefficient adjacent to the segment is present.

The quantization parameter generating unit 203 moves the process to step S1804 if the second transform coefficient is present ("YES" in step S1803) and to step S1805 if the second transform coefficient is not present.

In step S1804, the quantization parameter generating unit 203 generates the sub-band data included in the segment, and the second quantization parameters QpSb of the second transform coefficients, from QpBs. This will be described in detail later using FIG. 19.

If the process has moved to step S1805, the quantization parameter generating unit 203 generates the second quantization parameters QpSb of the sub-band data included in the segment from QpBs. It is assumed here that the third quantization parameters (QpBr) the second quantization parameters (QpBs) and the first quantization parameters (QpSb) are generated through the same method as in the first embodiment.

However, the configuration may be used in which, in step S1801, the third quantization parameters (QpBr) are generated with the second transform coefficients present at the upper end, the second transform coefficients present at the left and right of the lines, and so on included in the target code amount and generated code amount corresponding to the first unit of processing.

In step S1806, the quantization parameter generating unit 203 updates the segment for which the second quantization parameters QpSb are to be generated.

In step S1807, the quantization parameter generating unit 203 determines whether or not the generation of the second quantization parameters QpSb is complete for all channels and all segments in the band. If it is determined that the processing is complete, the quantization parameter generating unit 203 moves the process to step S1808. However, if the processing is determined to be incomplete, the quantization parameter generating unit 203 returns the process to step S1803, and repeats the process in units of segments until the generation of the second quantization parameters QpSb is complete for all segments in all channels.

In step S1808, the quantization parameter generating unit 203 determines whether or not the processing is complete for all bands. If the processing is complete, the quantization parameter generating unit 203 ends the process. However, if the processing is incomplete, the quantization parameter generating unit 203 returns the process to step S1801, and repeats the processing in units of bands until the processing is complete for all bands.

Figure 19:
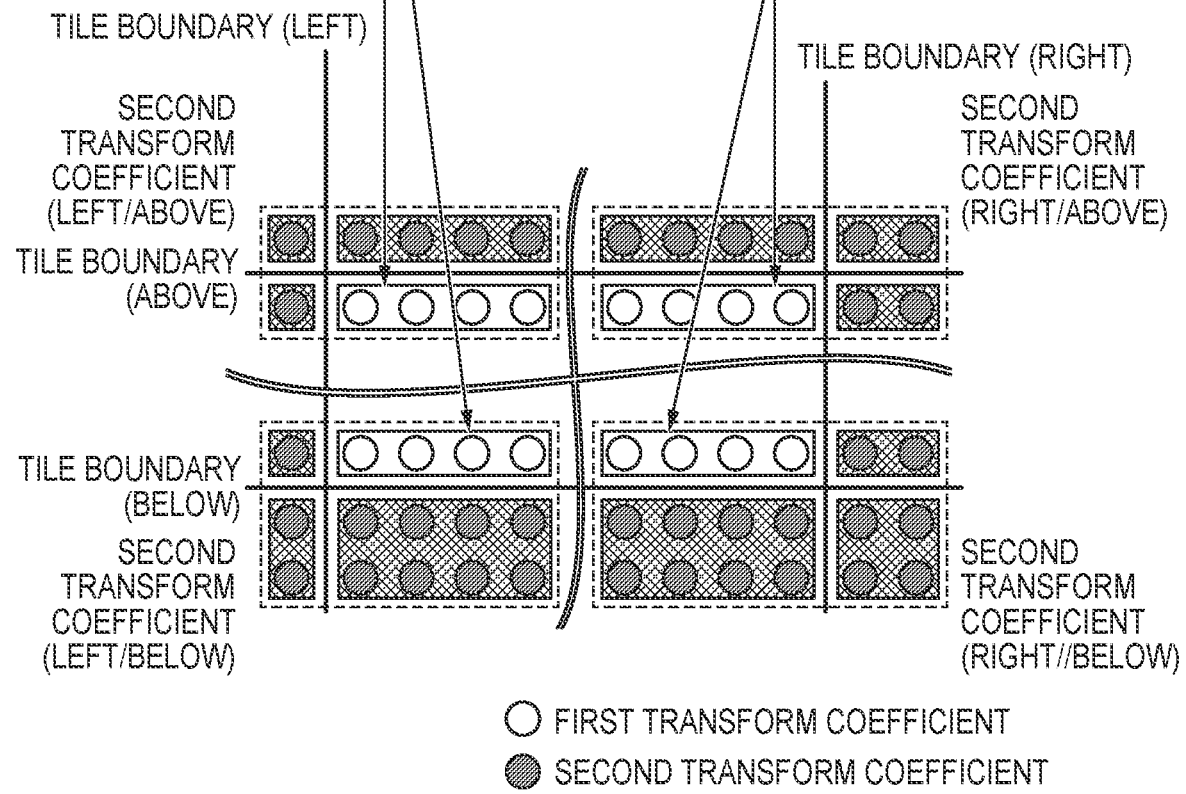
FIG. 19 is a diagram illustrating an example of a relationship between the mapping of common quantization parameters to a two-dimensional coordinate system, and sub-band data, according to the third embodiment.

FIG. 19 illustrates, as an example, the relationships between the second transform coefficients above, below, to the left, and to the right, and the first quantization parameters (QpBs), when the sub-bands are obtained by sub-band division at lev=1, in a case where a RAW image is divided into a plurality of tiles and adjacent tiles are present above, below, to the left, and to the right of the tile of interest.

Here, an example in which there is one second transform coefficient above and to the left and two second transform coefficients to the right and below is illustrated to describe the quantization parameter generating unit 203.

The process carried out by the quantization parameter generating unit 203 in step S1804 will be described using FIG. 19. The first transform coefficients and second transform coefficients surrounded by the dotted lines in FIG. 19 indicate that those coefficients refer to the same first quantization parameters (QpBs).

When the quantization parameter generating unit 203 generates the second quantization parameters (QpSb) for the segment referring to the first quantization parameters QpBs [1,1], for example, there are second transform coefficients adjacent to the segment being processed. Accordingly, the second quantization parameters (QpSb) are generated through the same method as in the first embodiment by referring not only to the first coefficients included in the segment being processed, but also by referring to the first quantization parameters QpBs[1,1] for the second quantization parameters of the adjacent or closest second transform coefficients.

Accordingly, the second quantization parameters of the first coefficients included in the segment being processed have the same values as the second quantization parameters of the adjacent or closest second transform coefficients.

With respect to the other second transform coefficients, the second quantization parameters are generated through the same method if adjacent second transform coefficients are present in the segment being processed.

Although FIG. 19 illustrates an example in which there are one or two second transform coefficients, the second quantization parameters (QpSb) of the second transform coefficients can be generated through the same system even when there are N second transform coefficients (where N is a constant).

The foregoing has described processing by the quantization parameter generating unit 203 in an encoding apparatus. In the same manner, the quantization parameter generating unit 213 in a decoding apparatus generates the second quantization parameters (QpSb) through the same method as that described in the first embodiment, by referring to the same first quantization parameters (QpBs) for the first transform coefficients included in the segment and the second quantization parameters of the second transform coefficients closest to the segment.

By carrying out processing as described above, when RAW image data is divided into a plurality of tiles and the second transform coefficients are generated in order to reduce degradation at the tile boundary, the RAW data can be recorded without increasing the data amount of the quantization parameters, as compared to a case where the second transform coefficients are not present.

Fourth Embodiment

A fourth embodiment will be described next. In the third embodiment, when the RAW image data is divided into a plurality of tiles and each tile is encoded, the quantization parameter generating unit 203 generates the second quantization parameters so that the second quantization parameters of the second transform coefficients and the first transform coefficients closest to the second transform coefficient have the same values. Accordingly, the quantization parameters of the second transform coefficients cannot be adjusted on the basis of the image quality evaluation result for the second transform coefficients, which is disadvantageous in terms of the image quality.

However, the fourth embodiment makes it possible to adjust the second quantization parameters on the basis of the image quality evaluation result for the second transform coefficients, by modifying the quantization parameter generation process carried out by the image capturing apparatus according to the third embodiment.

Descriptions of configurations that are the same as in the third embodiment will be omitted, and the following will describe configurations pertaining to differences in the method of generating the quantization parameters and the method of encoding the quantization parameters according to the present fourth embodiment.

In the following, the first unit of processing by which the first transform coefficients are updated and the quantization parameters are evaluated will be defined as a first segment, and the second unit of processing by which the second transform coefficients are evaluated and the quantization parameters are updated will be defined as a second segment.

Figure 20A:
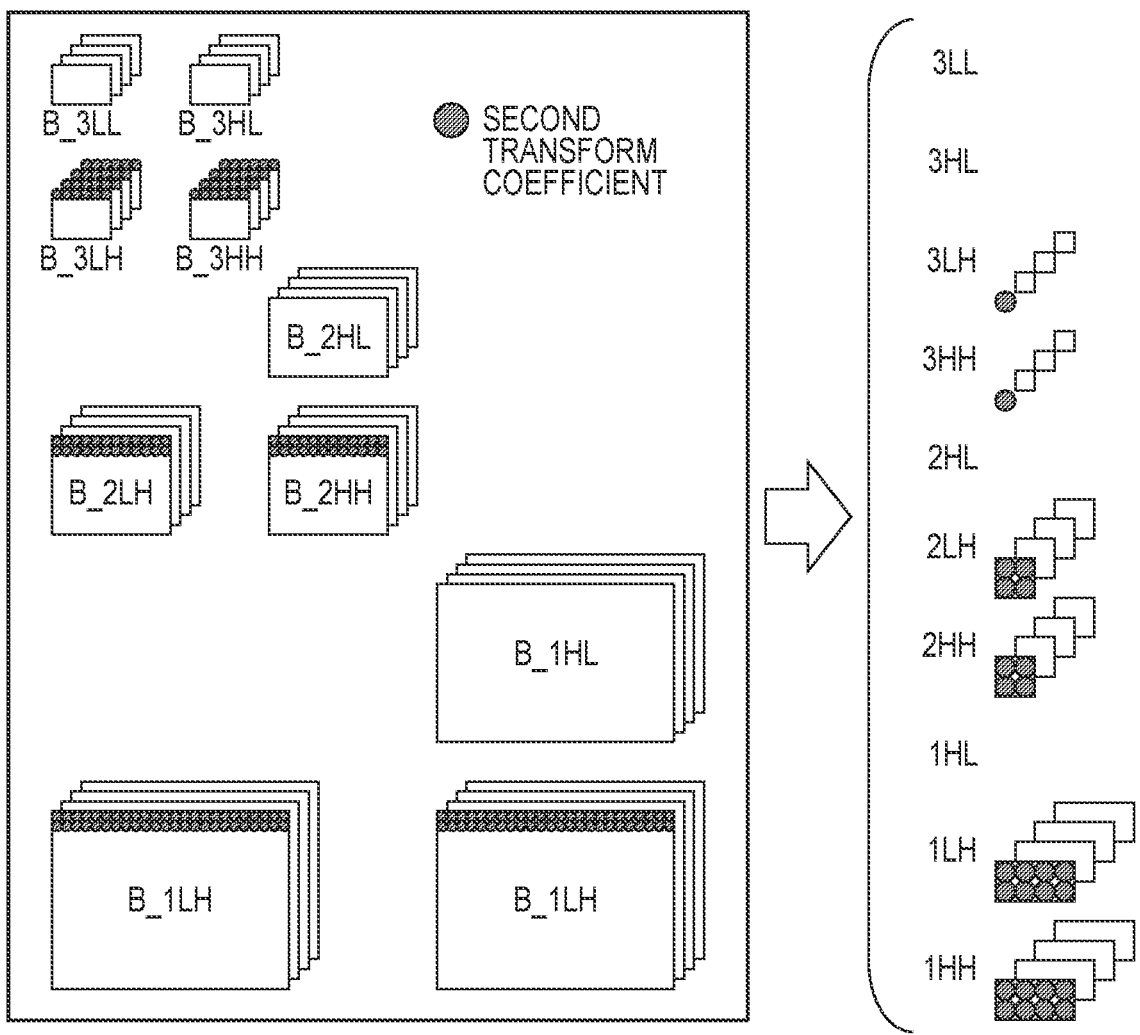
FIGS. 20A and 20B are diagrams illustrating an example of units of quantization control when a RAW image is divided in two in the vertical direction, according to a fourth embodiment.

FIG. 20A illustrates the second unit of processing (the second segment) by which the second transform coefficients are evaluated and the quantization parameters are updated, among the sub-band data pertaining to image quality control when each channel is divided into sub-bands at lev=3, in a case where, when a RAW image has been divided into upper and lower tiles, an adjacent tile is present above a tile of interest.

When the image is divided into upper and lower tiles and an adjacent tile is present above the tile of interest, the second transform coefficients are present above the first transform coefficients in units of lines.

Here, an example in which there is one second transform coefficient for the 3LH and 3HH sub-bands and two second transform coefficients for the 2LH, 2HH, 1LH, and 1HH sub-bands is given, for the purpose of describing the quantization parameter generating unit 203.

In each second segment, for all channels, the level 3 sub-bands {3LL,3HL,3LH,3HH} have 1×{line number of second transform coefficients} in both the horizontal and vertical directions, the level 2 sub-bands {2HL,2LH,2HH} have 2×{line number of second transform coefficients} in both the horizontal and vertical directions, and the level 1 sub-bands {1HL,1LH,1HH} have 4×{line number of second transform coefficients} in both the horizontal and vertical directions.

The quantization parameter generating unit 203 generates fourth quantization parameters (QpBs') for each second segment by correcting the initial quantization parameters QpBr(0) in accordance with the image quality properties for each second segment.

Figure 20B:
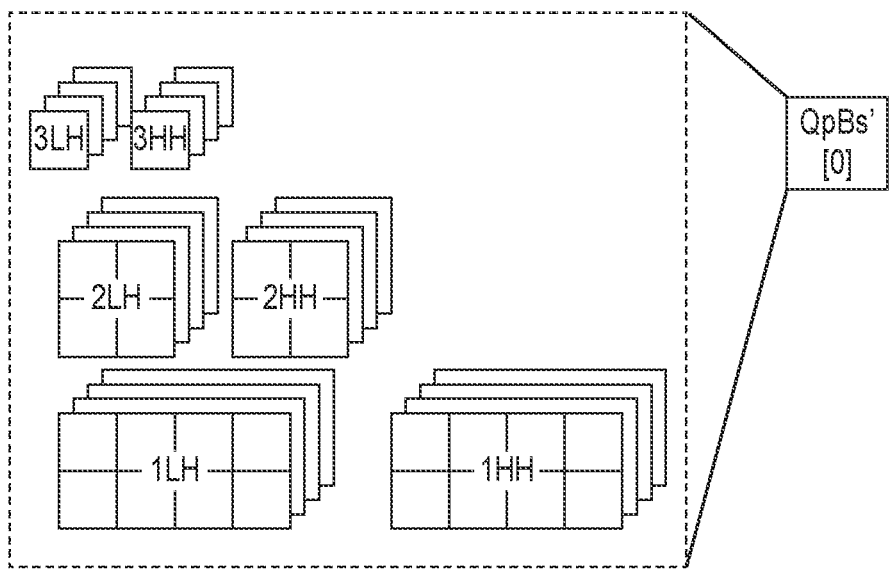

FIG. 20B illustrates the relationship between the fourth quantization parameters (QpBs') and the sub-band data (the second transform coefficients). As illustrated here, a single fourth quantization parameter (QpBs') is generated for a plurality of sub-band data (transform coefficients) in each channel included in a single segment, and in the vertical direction, a single fixed fourth quantization parameter (QpBs') is present at the upper end or the lower end, unlike in FIG. 6B described in the first embodiment.

Although FIGS. 20A and 20B illustrate a case where an adjacent tile is present at the upper end as described above, the processing is carried out as follows when there is an adjacent tile at the lower end.

Each second segment is the same as when there is an adjacent tile at the upper end. The quantization parameter generating unit 203 generates the fourth quantization parameters (QpBs') for each second segment by correcting the third quantization parameters (QpBr) of the final line for the first transform coefficients, in accordance with the image quality properties for each second segment.

With respect to the image quality properties of each second segment, for example, of the second transform coefficients included in each second segment, the quantization parameter generating unit 203 evaluates the 3LL sub-band data as a low-frequency component, and evaluates a high-frequency component from the 1HL, 1LH, and 1HH sub-band data. If a plurality of each sub-band data (second transform coefficients) to be evaluated are present within the second segment, an average value thereof is evaluated. Then, as in the first embodiment, the quantization parameter generating unit 203 adjusts the gain and offset for the third quantization parameters (QpBr) to carrying out control such that the quantization is finer when the amplitude of the low-frequency component is lower and the quantization is rougher as the amplitude of the high-frequency component is higher.

Figure 21A:
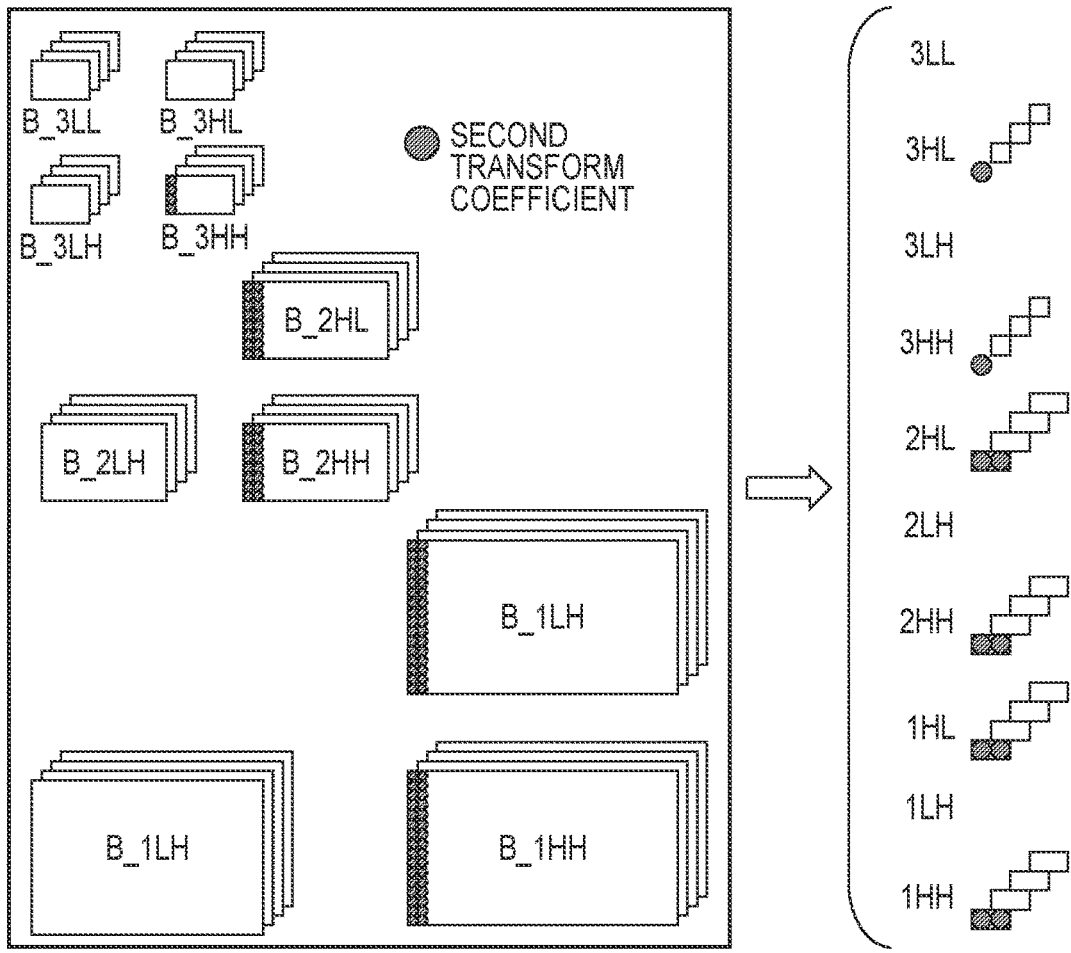
FIGS. 21A and 21B are diagrams illustrating an example of units of quantization control when a RAW image is divided in two in the horizontal direction, according to the fourth embodiment.

FIG. 21A illustrates the second unit of processing by which the second transform coefficients are evaluated and the quantization parameters are updated (the second segment), among the sub-band data pertaining to image quality control when each channel is divided into sub-bands at lev=3, in a case where, when RAW image data has been divided into right and left tiles, an adjacent tile is present to the left.

When the image is divided into left and right tiles and an adjacent tile is present on the left end, the second transform coefficients are present in vertical line units to the left of the first transform coefficients.

Here, an example in which there is one second transform coefficient for the 3HL and 3HH sub-bands and two second transform coefficients for the 2HL, 2HH, 1HL, and 1HH sub-bands is given, for the purpose of describing the quantization parameter generating unit 203.

In each second segment, for all channels, the level 3 sub-bands {3LL,3HL,3LH,3HH} have a [number of second transform coefficients in the horizontal direction]×1 in both the horizontal and vertical directions, the level 2 sub-bands {2HL,2LH,2HH} have a [number of second transform coefficients in the horizontal direction]×1 in both the horizontal and vertical directions, and the level 1 sub-bands {1HL, 1LH,1HH} have a [number of second transform coefficients in the horizontal direction]×1 in both the horizontal and vertical directions.

The quantization parameter generating unit 203 generates the fourth quantization parameters (QpBs') for each second segment by correcting the quantization parameters QpBr in accordance with the image quality properties for each second segment. The method of correction in accordance with the image quality properties for each second segment is the same as the method described with reference to FIG. 20B.

Figure 21B:
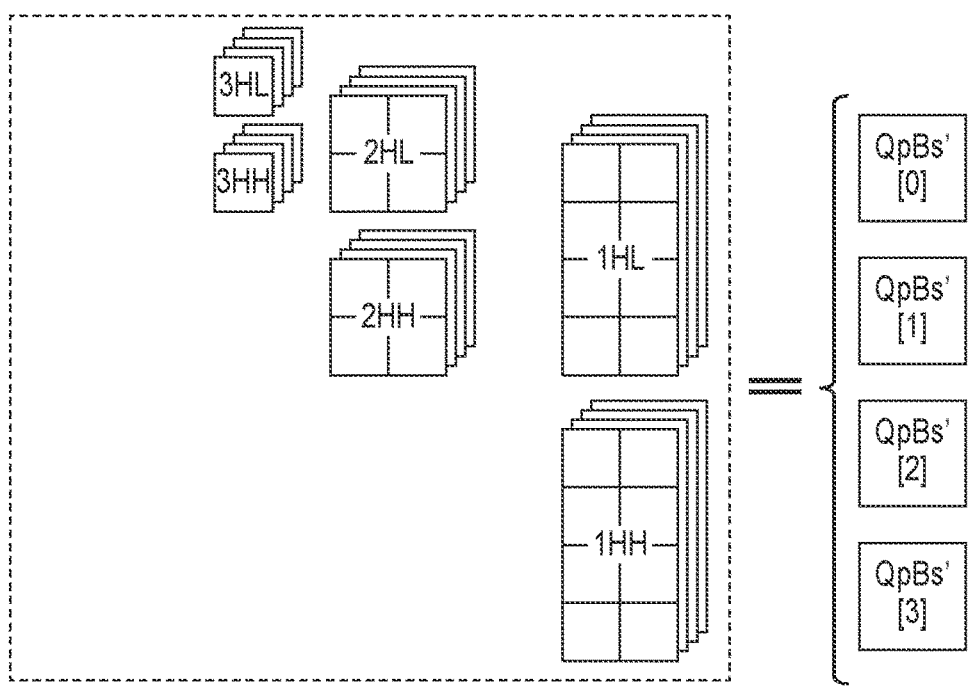

FIG. 21B illustrates the relationship between the fourth quantization parameters (QpBs') and the sub-band data (the second transform coefficients). As illustrated here, four fourth quantization parameters (QpBs') are generated for a plurality of sub-band data (second transform coefficients) in each channel included in a single segment, and the vertical direction has the same relationship as that described in the first embodiment with reference to FIG. 6B.

The method for calculating QpLv1 to QpLv3 for each level from the four QpBs' in level 1 is assumed to be as indicated by the aforementioned equation (6) described in the second embodiment, and thus descriptions thereof will be omitted here.

Figure 22A:
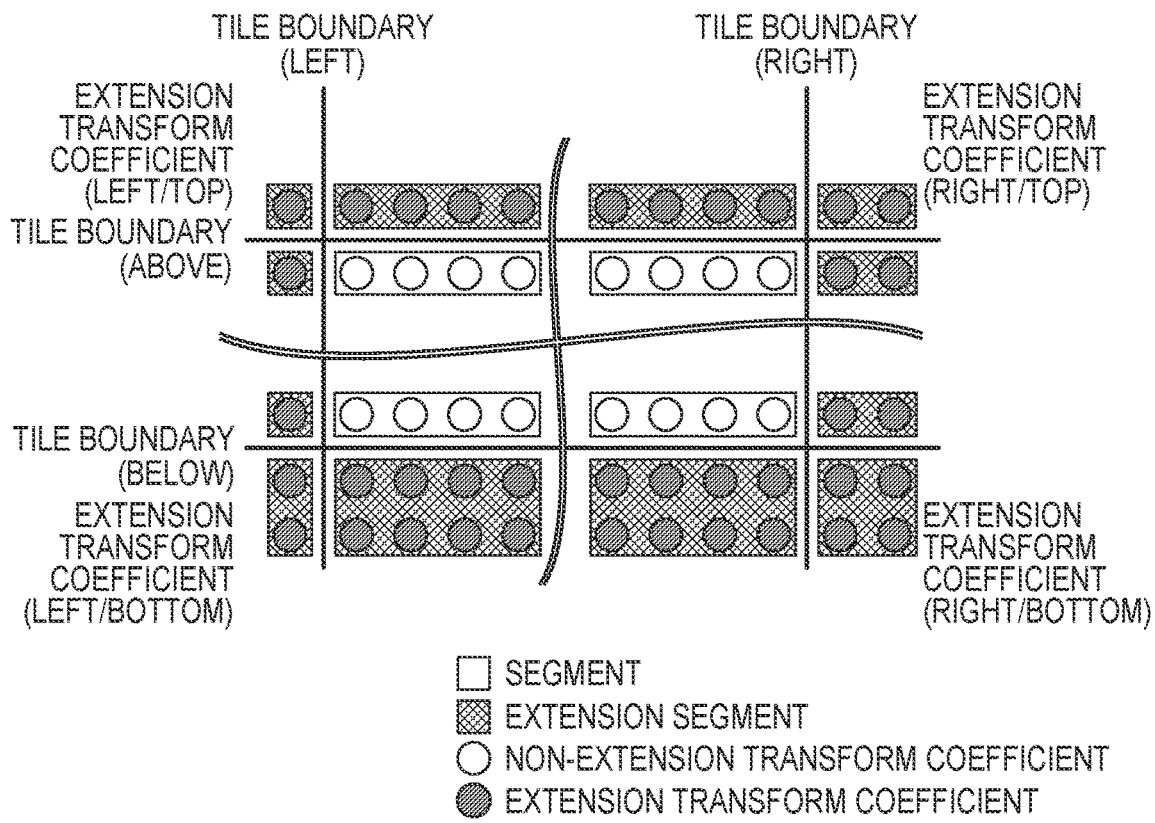
FIGS. 22A to 22C are diagrams illustrating an example of a relationship between the mapping of common quantization parameters to a two-dimensional coordinate system, and sub-band data, according to the fourth embodiment.

FIG. 22A illustrates a case where a RAW image is divided into a plurality of tiles and adjacent tiles are present above, below, to the left, and to the right of the tile of interest, and illustrates the relationships between the second transform coefficients above, below, to the left, and to the right, the first quantization parameters (QpBs), and the fourth quantization parameters (QpBs'), using the lev=1 sub-band as an example. Here, as in FIG. 19, an example in which there is one second transform coefficient above and to the left and two second transform coefficients to the right and below is illustrated to describe the quantization parameter generating unit 203. According to the definition of the second segment given earlier, each second transform coefficient is included in a corresponding second segment. The second segment is present in each direction in which there is an adjacent tile with respect to the first segment (above, below, to the left, and to the right, in this case).

The fourth quantization parameters (QpBs') for each second segment are similarly present in each direction in which there is an adjacent tile with respect to the first quantization parameters (QpBs) corresponding to the first segments (above, below, to the left, and to the right, in this case).

The quantization parameter generating unit 203 calculates individual fifth quantization parameters (QpSb') for each channel and each sub-band included in the second segment by referring to the fourth quantization parameters (QpBs').

Equation (7) is a formula for generating the fifth quantization parameters (QpSb').

$$QpSb'[i][j]=QpBs'\times\alpha[i][j]+\beta[i][j] \quad (7)$$

QpSb': individual fifth quantization parameters for each channel and each sub-band
QpBs': fourth quantization parameters common for all channels and all sub-bands
α: slope
β: intercept
i: channel index (0 to 3)
j: sub-band index (0 to 9)

The only difference from equation (5) for calculating the second quantization parameters is that the quantization parameters referred to have been changed to the fourth quantization parameters (QpBs'), and thus detailed descriptions will be omitted.

The quantization parameter encoding unit 206 encodes the first quantization parameters (QpBs) and the fourth quantization parameters (QpBs') in a mixed state, and inputs and encodes the second quantization parameters (QpBs) and the fourth quantization parameters (QpBs') in raster order with respect to the coordinate positions of the corresponding segments.

In the example in FIG. 22A, the first quantization parameters (QpBs) and the fourth quantization parameters (QpBs') are input to the quantization parameter encoding unit 206 in the following order.

Figure 22B:
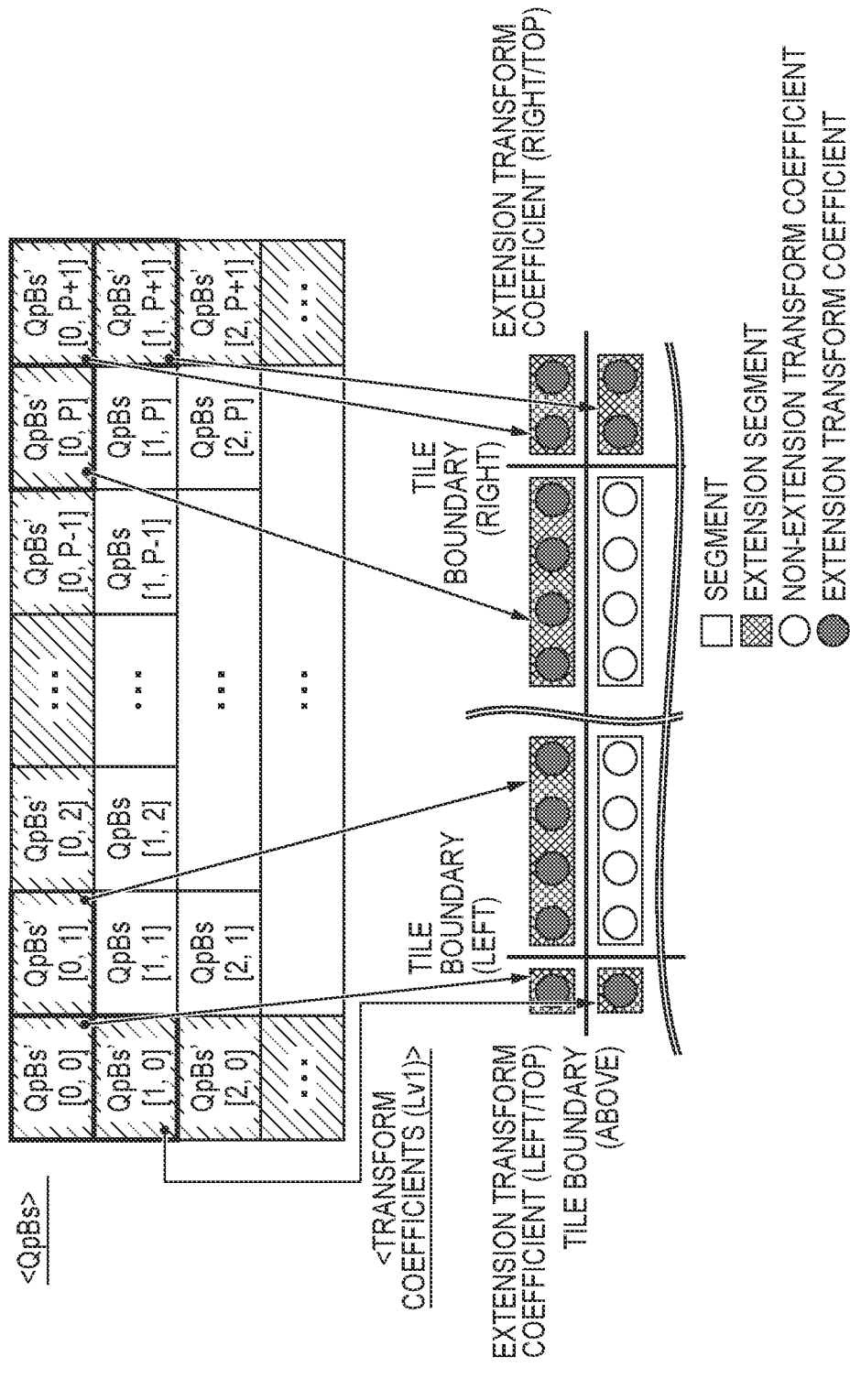
Figure 22C:
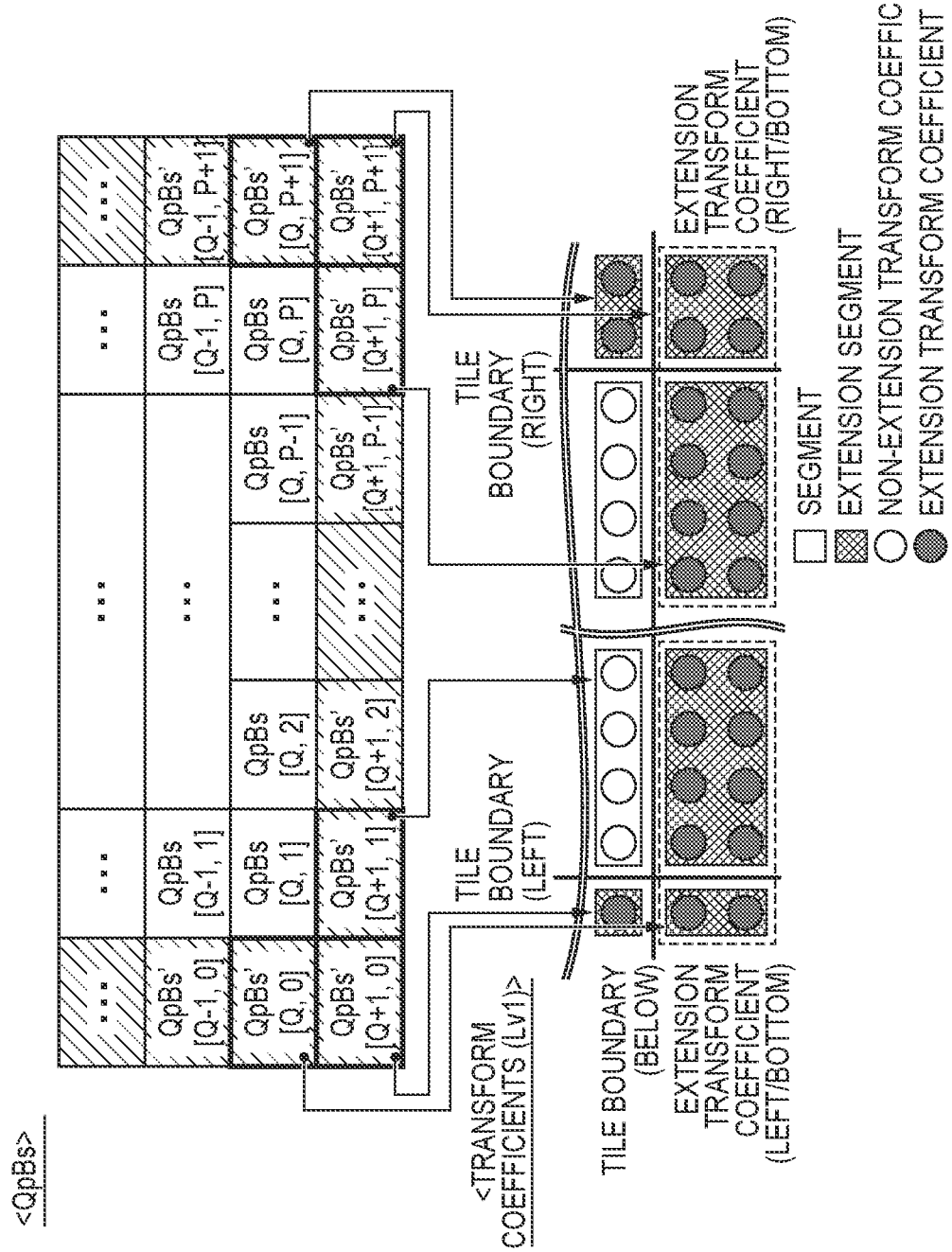

$QpBs'[0, 0], QpBs'[0, 1], \ldots, QpBs'[0, P+1],$ $QpBs'[1, 0], QpBs[0, 1], \ldots, QpBs'[1, P+1],$ $\ldots$ $QpBs'[Q, 0], QpBs[Q, 1], \ldots, QpBs'[Q, P+1]$ $QpBs'[Q+1, 0], QpBs'[Q+1, 1], \ldots, QpBs'[Q+1, P+1]$ FIGS. 22B and 22C illustrate a relationship between the second segment and the fourth quantization parameters (QpBs').

FIG. 22B illustrates a relationship between the second segment and the fourth quantization parameters (QpBs') near the upper-end tile boundary. Each of the second transform coefficients included in the second segment references the fourth quantization parameters (QpBs') corresponding to the second segment.

FIG. 22C illustrates a relationship between the second segment and the fourth quantization parameters (QpBs') near the lower-end tile boundary, and each of the second transform coefficients included in the second segment reference the fourth quantization parameters (QpBs') corresponding to the second segment, for a similar relationship as with the upper-end tile boundary.

The foregoing has described the processing by the quantization parameter generating unit 203 in the encoding apparatus. The following processing is carried out in the decoding apparatus.

The quantization parameter decoding unit 212 decodes the first quantization parameters and the fourth quantization parameters included in the encoded data input from the memory 105. Using the decoded first quantization parameters, the quantization parameter generating unit 213 generates the second quantization parameters used when generating the first transform coefficients through inverse quantization, and using the decoded fourth quantization parameters, generates the fifth quantization parameters used when generating the second transform coefficients through inverse quantization. The inverse quantization unit 214 uses the second quantization parameters to inverse-quantize the quantized first transform coefficients output from the decoding unit 211, and inverse-quantizes the quantized second transform coefficients using the fifth quantization parameters. The frequency inverse transforming unit 215 takes the first transform coefficients and the second transform coefficients as inputs, carries out a frequency transform process through discrete wavelet inverse transform, and restores the channel from the sub-band data (transform coefficients) in the predetermined division level.

The channel inverse transforming unit 216 takes the data from the frequency inverse transforming unit 215 as an input, and generates Bayer pattern RAW image data in units of tiles. The tile merging unit 2302 then connects the tiles to generate a single frame of the RAW image data, and then outputs the image data.

By generating and encoding the fourth quantization parameters (QpBs') corresponding to the second segment as described above, the quantization parameters of the second transform coefficients can be corrected in accordance with the image quality properties for each second segment, which makes it possible to record higher-quality RAW data with only a slight increase in the code amount of the quantization parameters.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-114689, filed Jun. 15, 2018, which is hereby incorporated by reference herein in its entirety.

What is claimed is:

1. An encoding apparatus that encodes Bayer pattern RAW image data, the apparatus comprising a memory and at least one processor which function as:
a dividing unit that divides RAW image data to be encoded into a plurality of tiles;
a channel transforming unit that transforms RAW image data into planes of a plurality of channels having mutually-different components, for each of the tiles obtained from the division by the dividing unit;
a frequency transforming unit that frequency-transforms the plane of each channel from the transformation by the channel transforming unit, and generates a plurality of sub-band data of a respective plurality of resolution levels;
a quantization parameter generating unit that (i) determines first quantization parameters corresponding to a plurality of segments which are obtained by dividing each of the plurality of sub-band data into a same number of segments, where the first quantization parameters are common for segments of the plurality of sub-band data corresponding to a same area in the RAW image data and (ii) determines second quantization parameters for each segment of the plurality of sub-band data based on (a) the determined first quantization parameters and (b) coefficients set to each of the plurality of sub-band data;
a quantization unit that quantizes each sub-band data obtained by the frequency transforming unit based on the second quantization parameters; and
an encoding unit that encodes a quantization result, obtained from the quantizing, on a sub-band-by-sub-band basis,
wherein when transforming the RAW image data into the planes of the plurality of channels from a tile of interest, the channel transforming unit transforms the RAW image data into the planes of the plurality of channels from (1) data in the tile of interest, and (2) data in an adjacent tile, adjacent to the tile of interest, within a predetermined distance from a boundary with the tile of interest, and
wherein when the quantization parameter generating unit determines the first quantization parameters for the data in the tile of interest and the data in the adjacent tile where the sub-band data of the tile of interest has been divided into a plurality of segments, the quantization parameter generating unit determines the first quantization parameters to be applied to the plurality of segments, wherein the first quantization parameters are applied to the sub-band data of the adjacent tile.

2. The apparatus according to claim 1, wherein the coefficients are set in accordance with a compression rate set for encoded data.

3. The apparatus according to claim 1, wherein the coefficients are assigned in common to a plurality of first quantization parameters respectively corresponding to a plurality of segments.

4. The apparatus according to claim 1, wherein the first quantization parameters are quantization parameters that are common for the plurality of sub-bands in the planes of the plurality of channels.

5. The apparatus according to claim 1, wherein the quantization parameter generating unit determines the second quantization parameters by correcting the first quantization parameters using coefficients set for each of the plurality of sub-band data corresponding to the plane of each channel.

6. The apparatus according to claim 1, further comprising a recording unit that records, into a recording medium, the first quantization parameters determined for each of the segments, along with the sub-band data encoded by the encoding unit.

7. The apparatus according to claim 1, further comprising a recording unit that records, into a recording medium, the first quantization parameters determined for each of the segments, and the coefficients, along with the sub-band data encoded by the encoding unit.

8. The apparatus according to claim 1, wherein the frequency transforming unit executes a wavelet transform, and
wherein the distance is a distance based on the number of times the wavelet transform is executed.

9. The apparatus according to claim 1, wherein the quantization parameter generating unit determines the first quantization parameters of each segment on the basis of a coefficient of a low-frequency sub-band in each segment.

10. A method of controlling an encoding apparatus that encodes Bayer pattern RAW image data, the method comprising:
dividing the RAW image data to be encoded into a plurality of tiles;
transforming RAW image data into planes of a plurality of channels having mutually-different components, for each of the tiles obtained from the dividing;
frequency-transforming the plane of each channel from the transforming, and generating a plurality of sub-band data of a respective plurality of resolution levels;
determining first quantization parameters corresponding to a plurality of segments which are obtained by dividing each of the plurality of sub-band data into a same number of segments, where the first quantization parameters are common for segments of the plurality of sub-band data corresponding to a same area in the RAW image data;
determining second quantization parameters for each segment of the plurality of sub-band data based on (a) the determined first quantization parameters and (b) coefficients set to each of the plurality of sub-band data;
quantizing each sub-band data obtained in the frequency-transforming based on the second quantization parameters; and
encoding a quantization result, obtained from the determining and quantizing, on a sub-band-by-sub-band basis,
wherein when transforming the RAW image data into the planes of the plurality of channels from a tile of interest, the transforming the RAW image data transforms the RAW image data into the planes of the plurality of channels from (1) data in the tile of interest, and (2) data in an adjacent tile, adjacent to the tile of interest, within a predetermined distance from a boundary with the tile of interest, and
wherein when the determining the first quantization parameters determines the first quantization parameters for the data in the tile of interest and the data in the adjacent tile where the sub-band data of the tile of interest has been divided into a plurality of segments, the determining the first quantization parameters determines the first quantization parameters to be applied to the plurality of segments, wherein the first quantization parameters are applied to the sub-band data of the adjacent tile.

11. A non-transitory computer-readable storage medium storing a program for executing a method of controlling an encoding apparatus that encodes Bayer pattern RAW image data, the method comprising:
dividing the RAW image data to be encoded into a plurality of tiles;
transforming RAW image data into planes of a plurality of channels having mutually-different components, for each of the tiles obtained from the dividing;
frequency-transforming the plane of each channel from the transforming, and generating a plurality of sub-band data of a respective plurality of resolution levels;
determining first quantization parameters corresponding to a plurality of segments which are obtained by dividing each of the plurality of sub-band data into a same number of segments, where the first quantization parameters are common for segments of the plurality of sub-band data corresponding to a same area in the RAW image data;
determining second quantization parameters for each segment of the plurality of sub-band data based on (a) the determined first quantization parameters and (b) coefficients set to each of the plurality of sub-band data;
quantizing each sub-band data obtained in the frequency-transforming based on the second quantization parameters; and
encoding a quantization result, obtained from the determining and quantizing, on a sub-band-by-sub-band basis,
wherein when transforming the RAW image data into the planes of the plurality of channels from a tile of interest, the transforming the RAW image data transforms the RAW image data into the planes of the plurality of channels from (1) data in the tile of interest, and (2) data in an adjacent tile, adjacent to the tile of interest, within a predetermined distance from a boundary with the tile of interest, and
wherein when the determining the first quantization parameters determines the first quantization parameters for the data in the tile of interest and the data in the adjacent tile where the sub-band data of the tile of interest has been divided into a plurality of segments, the determining the first quantization parameters determines the first quantization parameters to be applied to the plurality of segments, wherein the first quantization parameters are applied to the sub-band data of the adjacent tile.

* * * * *